United States Patent
Bajcsy et al.

(10) Patent No.: US 9,473,332 B2
(45) Date of Patent: Oct. 18, 2016

(54) METHODS AND DEVICES FOR COMMUNICATIONS SYSTEMS USING MULTIPLIED RATE TRANSMISSION

(71) Applicant: The Royal Institution for the Advancement of Learning / McGill University, Montreal (CA)

(72) Inventors: Jan Bajcsy, Baie D'Urfe (CA); Yong-Jin Kim, Montreal (CA); Aminata Amadou Garba, Ottawa (CA)

(73) Assignee: The Royal Institution for the Advancement of Learning / McGill University, Montreal (CA)

( * ) Notice: Subject to any disclaimer, the term of this patent is extended or adjusted under 35 U.S.C. 154(b) by 20 days.

(21) Appl. No.: 14/396,988

(22) PCT Filed: Apr. 29, 2013

(86) PCT No.: PCT/CA2013/000415
§ 371 (c)(1),
(2) Date: Oct. 24, 2014

(87) PCT Pub. No.: WO2013/159207
PCT Pub. Date: Oct. 31, 2013

(65) Prior Publication Data
US 2015/0110216 A1    Apr. 23, 2015

Related U.S. Application Data

(60) Provisional application No. 61/639,137, filed on Apr. 27, 2012.

(51) Int. Cl.
*H03K 7/04*    (2006.01)
*H03K 7/06*    (2006.01)
(Continued)

(52) U.S. Cl.
CPC ........... *H04L 25/03197* (2013.01); *H04B 1/40* (2013.01); *H04L 25/03171* (2013.01);
(Continued)

(58) Field of Classification Search
CPC .............. H04B 1/71637; H04B 1/719; G01S 13/0209; H01Q 9/005; H01Q 13/08
USPC ................ 375/130–153, 237–239, 256–285, 375/295–296, 316, 340–353
See application file for complete search history.

(56) References Cited

U.S. PATENT DOCUMENTS 5,677,927 A * 10/1997 Fullerton .................. H04B 1/69
                                                              375/130
5,832,035 A * 11/1998 Fullerton .................. H04B 1/56
                                                              375/149

(Continued)

OTHER PUBLICATIONS

Kozek et al., "Non-Orthogonal Pulse Shapes for Multicarrier Communications in Doubly Dispersive Channels" (IEEE J. Sel. Areas Comms., vol. 16, pp. 1579-1589).

(Continued)

*Primary Examiner* — James M Perez
(74) *Attorney, Agent, or Firm* — The Law Office of Michael E. Kondoudis

(57) ABSTRACT

Cost, electronic circuitry limitations, and communication channel behavior yield communication systems with strict bandwidth constraints. Hence, maximally utilizing available bandwidth is crucial, for example in wireless networks, to supporting ever increasing numbers of users and their demands for increased data volumes, low latency, and high download speeds. Accordingly, it would be beneficial for such networks to support variable bandwidth allocations such that smaller frequency sub-bands are allocated to users, as their number increases, but the individual users/nodes insert more data-carrying signals in order to compensate for the loss of operating bandwidth arising from the accommodation of more users. It would further be beneficial for transmitters and receivers according to embodiments of such a network architecture to be based upon low cost design methodologies allowing their deployment within a wide range of applications including high volume, low cost consumer electronics for example.

22 Claims, 15 Drawing Sheets

(51) Int. Cl.
*H03K 9/04* (2006.01)
*H03K 9/06* (2006.01)
*H04L 25/03* (2006.01)
*H04B 1/40* (2015.01)
*H04L 27/34* (2006.01)
*H04L 25/06* (2006.01)
*H04L 27/26* (2006.01)
*H04L 5/00* (2006.01)

(52) U.S. Cl.
CPC ......... *H04L25/03343* (2013.01); *H04L 25/06* (2013.01); *H04L 27/264* (2013.01); *H04L 27/34* (2013.01); *H04L 5/0044* (2013.01); *H04L 2025/03414* (2013.01); *H04L 2025/03426* (2013.01)

(56) References Cited

U.S. PATENT DOCUMENTS

| | | | | |
|---|---|---|---|---|
| 6,748,040 B1* | 6/2004 | Johnson | H04B 1/69 | 375/354 |
| 6,763,057 B1* | 7/2004 | Fullerton | H04B 1/7176 | 370/322 |
| 7,054,349 B2* | 5/2006 | Cattaneo | H04B 1/7183 | 375/130 |
| 7,221,911 B2* | 5/2007 | Knobel | H04B 1/71632 | 370/342 |
| 7,302,009 B2* | 11/2007 | Walton | H04B 7/043 | 375/130 |
| 7,526,039 B2* | 4/2009 | Kim | H04L 1/0618 | 375/259 |
| 7,573,863 B2* | 8/2009 | Boland | H04W 72/1205 | 370/350 |
| 7,577,415 B1* | 8/2009 | Richards | H04W 52/241 | 455/127.1 |
| 7,583,763 B2* | 9/2009 | Nissani (Nissensohn) | H04L 1/02 | 375/316 |
| 7,672,401 B2* | 3/2010 | Mysore | H04B 7/0845 | 370/203 |
| 7,689,132 B2* | 3/2010 | Chen | H04B 10/11 | 398/149 |
| 7,693,551 B2* | 4/2010 | Ojard | H01Q 21/00 | 375/259 |
| 8,014,425 B2* | 9/2011 | Ekbal | H04B 1/71632 | 370/517 |
| 8,279,985 B2* | 10/2012 | Liu | H04L 1/0036 | 375/260 |
| 8,325,844 B2* | 12/2012 | Walton | H04B 7/0417 | 375/130 |
| 8,385,489 B2* | 2/2013 | Azadet | H04L 25/0232 | 375/232 |
| 8,451,944 B2* | 5/2013 | Gaur | H04B 7/0426 | 375/296 |
| 8,705,647 B2* | 4/2014 | Wang | H04L 25/0328 | 375/260 |
| 8,798,184 B2* | 8/2014 | Su | H04B 7/0617 | 375/260 |
| 8,811,456 B2* | 8/2014 | Julian | H04W 16/14 | 375/219 |
| 8,938,002 B2* | 1/2015 | Matsumoto | H04H 40/90 | 370/535 |
| 9,320,053 B2* | 4/2016 | Wigren | H04W 72/1268 | 375/219 |
| 2002/0018514 A1* | 2/2002 | Haynes | H04B 1/7183 | 375/130 |
| 2003/0076890 A1* | 4/2003 | Hochwald | H03M 13/2957 | 375/264 |
| 2003/0103584 A1* | 6/2003 | Bjerke | H04L 1/0003 | 375/340 |
| 2003/0232612 A1* | 12/2003 | Richards | H04B 1/7093 | 455/323 |
| 2004/0047426 A1* | 3/2004 | Nissani Nissensohn | H04L 25/0242 | 375/259 |
| 2004/0101032 A1* | 5/2004 | Dabak | H04B 1/7093 | 375/143 |
| 2004/0190636 A1* | 9/2004 | Oprea | H04B 7/0417 | 375/260 |
| 2004/0228244 A1* | 11/2004 | Kim | G11B 7/0053 | 369/52.1 |
| 2005/0013386 A1* | 1/2005 | Ojard | H04B 1/719 | 375/316 |
| 2005/0089083 A1* | 4/2005 | Fisher | H04B 1/7075 | 375/130 |
| 2006/0047842 A1* | 3/2006 | McElwain | H03M 13/2957 | 709/231 |
| 2006/0078075 A1* | 4/2006 | Stamoulis | H04L 25/03171 | 375/346 |
| 2006/0087472 A1* | 4/2006 | Troutman | F42C 11/008 | 342/68 |
| 2006/0088081 A1* | 4/2006 | Withington | H04B 1/71635 | 375/130 |
| 2006/0145853 A1* | 7/2006 | Richards | G01S 13/0209 | 340/572.1 |
| 2007/0253476 A1* | 11/2007 | Tirkkonen | H04L 1/06 | 375/230 |
| 2009/0147876 A1* | 6/2009 | Ouyang | H04B 7/0417 | 375/267 |
| 2013/0136201 A1* | 5/2013 | Chen | H04L 25/03898 | 375/267 |

OTHER PUBLICATIONS

Mazo, "Faster-than-Nyquist Signaling" (Bell Sys. Tech. J., vol. 54, pp. 1451-1462).
Cover, "Broadcast Channels" (IEEE Trans. Inf. Theory, vol. IT-18, pp. 2-14).
Bergmans, "A Simple Converse for Broadcast Channels with Additive White Gaussian Noise" (IEEE Trans. Inf. Theory, vol. IT-20, pp. 279-290).
Costa, "Writing on Dirty Paper" (IEEE Trans. Inf. Theory, vol. 29, pp. 439-441).
Sun et al., "Superposition Turbo TCM for Multirate Broadcast" (IEEE Trans. Comm., vol. 52, pp. 368-371).
Berlin et al., "LDPC Codes for Fading Gaussian Broadcast Channels" (IEEE Trans. Inf. Theory, vol. 51, pp. 2173-2182).
Uppal et al., "Code Design for MIMO Broadcast Channels" (IEEE Trans. Comms., vol. 5, pp. 986-996).
Ramezani et al., "Disjoint LDPC Coding for Gaussian Broadcast Channels" (Proc. IEEE Int. Symp. Inf. Theory, pp. 938-942, 2009).
Amraoui et al., "Coding for the MIMO Broadcast Channel" (Proc. IEEE Int. Symp. Inf. Theory, pp. 296, 2003).
Zamir et al., "Nested Linear/Lattice Codes for Structured Multiterminal Binning" (IEEE Trans. Inf. Theory, vol. 49, pp. 1250-1276).
Valenti et al., "The UMTS Turbo Code and an Efficient Decoder Implementation Suitable for Software-Defined Radio" (Int. J. Wireless Inf. Networks, vol. 8, pp. 203-215).
Brink, "Designing Iterative Decoding Schemes with the Extrinsic Information Transfer Chart" (AEU Int. J. Electron. Commun., vol. 54, pp. 389-398).
Colavolpe et al., "On MAP Symbol Detection for ISI Channels using Ungerboeck Observation Model" (IEEE Comm. Lett., vol. 9, pp. 720-722).

* cited by examiner

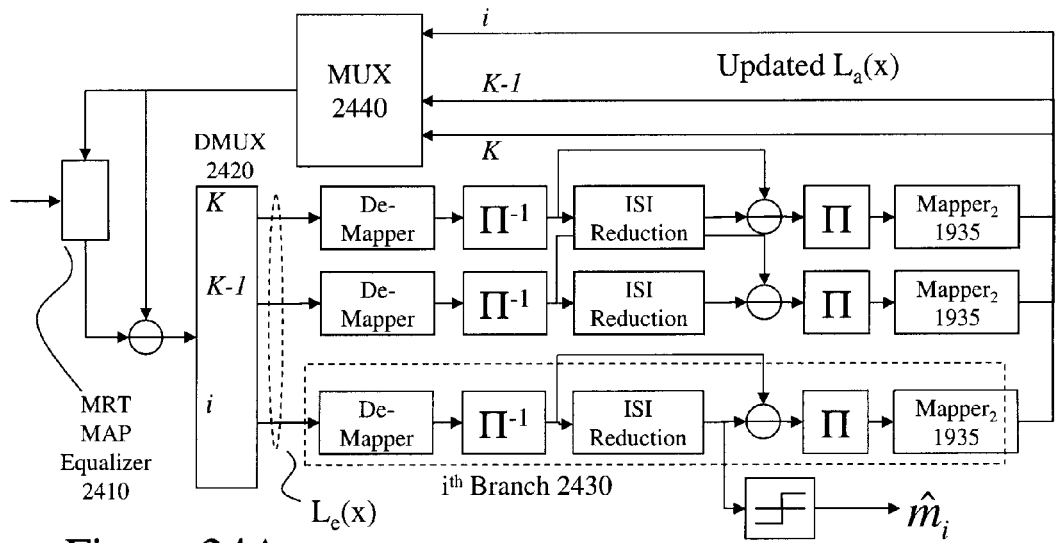
Figure 24A
Figure 24B
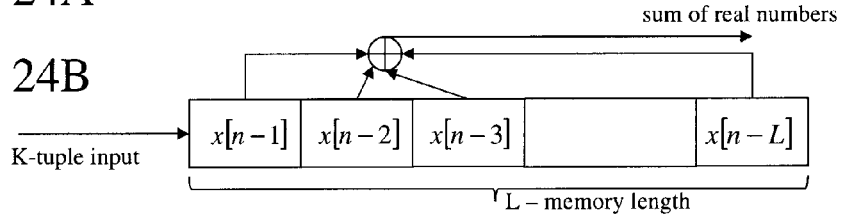
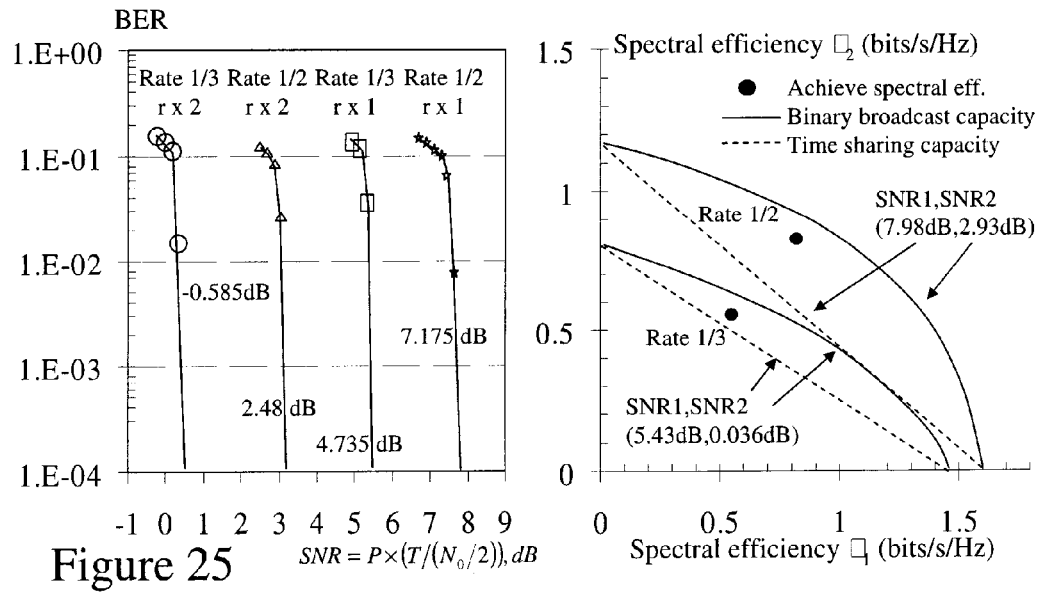
Figure 25

METHODS AND DEVICES FOR COMMUNICATIONS SYSTEMS USING MULTIPLIED RATE TRANSMISSION

CROSS-REFERENCE TO RELATED APPLICATIONS

This patent application claims the benefit of U.S. Provisional Patent Application 61/639,137 filed Apr. 27, 2012 entitled "Multiplied Rate Data Transmission System", the entire contents of which are included by reference.

FIELD OF THE INVENTION

This invention relates to data transmission systems, transmitters, and receivers and more particularly to data transmission over continuous-time channels affected by noise, fading, intersymbol interference, distortion, and/or bandwidth-limited constraints.

BACKGROUND OF THE INVENTION

One of the main goals of any practical communication system is to capitalize on the available communication resources such as available power, energy, frequency spectrum (bandwidth), time for transmission, and/or cost and size of communication system circuitry. Accordingly, due to the cost, physical limitation of electronic circuitry, government/standard restrictions and the behaviour of communication channels, actual communication systems have strict bandwidth constraints and hence it becomes crucial to maximally utilize the available bandwidth or power given other resources available to the designer. One commonly used measure for bandwidth utilization in practical communication systems is called spectral efficiency, which is defined as a rate of information transfer per time and bandwidth unit (e.g., bits per second per Hertz).

Current state of the art communications systems are designed to transmit digital data over continuous-time channels, see for example Proakis in "Digital Communications" (McGraw Hill, 2001) where a sequence of blocks of modulation values for transmission over a continuous band limited channel, for example $\underline{X}=[x[0], x[1], \ldots, x[N-1]]$, are modulated by a Modulator Unit 110 within the transmitter (not shown for clarity) using a modulation pulse shape s(t) to form a continuous time signal v(t) as given by Equation (1). This continuous time signal is passed over a channel, which is represented in as Channel 150, which introduces additive white Gaussian noise (AWGN), n(t), with a double-sided power spectral density $N_0/2$, to yield received signal č(t). At the receiver (not shown for clarity) a De-Modulator Unit 160 demodulates the continuous time signal, for example by sampling a matched filter forming part of the receiver at intervals T yielding a sequence of blocks of demodulated data $Y=[y[0], y[1], \ldots, y[N-1]]$ which can be expressed by Equation (2) where $\bar{s}(t)$ denotes the complex conjugate of s(t) in the case of complex signals.

$$v(t) = \sum_{n=0}^{N-1} x[n]s(t-nT). \quad (1)$$

$$y[n] = \int v(t)\bar{s}(t-nT)dt \quad (2)$$

As depicted in FIG. 1, each of the Modulator Unit 110 and De-Modulator Unit 160 receive modulation pulse shape s(t) and timing T as inputs. Generally, communications systems make use of symmetric, unit normalized energy modulation pulses, $\|s(t)\|^2 = \int_{-\infty}^{\infty}|s(t)|^2=1$, designed to reduce interference from adjacent modulation values, commonly referred to as InterSymbol Interference (ISI), by keeping $\int_{-\infty}^{\infty} s(t-iT)\bar{s}(t-jT)dT$ for i≠j equal or close to zero for any integers i and j. Further, the shape of the modulation pulses s(t) is generally chosen to Limit or Concentrate the Spectral Energy in a Frequency Range f ∈ [−½ T, ½ T]. Accordingly, transmitting data at intervals T using pulse shapes with total bandwidth $f_0$, e.g. f ∈ [−$f_0$, $f_0$], is generally referred to as signaling at the Nyquist rate and traditionally represented the upper bound for signaling rate across bandwidth limited channels affected by noise.

Accordingly, within the prior art increasing effective transmission rates from a transmitter to a receiver has focused to avoiding ISI from the transmitter by using a set of orthogonal modulating signals, s(t), s(t−T), . . . , s(t−nT), which may then be temporally and/or frequency overlapped, as long as the inner products of these signals remain zero, i.e. $\int_{-\infty}^{\infty} s(t-iT)\bar{s}(t-jT)dt=0$ for any i≠j. Such techniques include, but are not limited to, Orthogonal Frequency Division Multiplexing (OFDM) within telecommunications allowing a large number of closely spaced orthogonal sub-carrier signals to be used to carry data on several parallel data streams or channels whilst each sub-carrier is modulated with a conventional modulation scheme such as quadrature amplitude modulation (QAM) or phase-shift keying (PSK) at a lower symbol rate. Such techniques currently dominate telecommunication networks including for example those relating to digital television and audio broadcasting, DSL broadband internet access, wireless networks, fiber-optic communications, free-space optical communications, Wi-Fi, and fourth generation "4G" mobile communications.

Accordingly, given the demands on such communications systems with evolving connectivity of users, evolving demands from static to dynamic content, and reducing cost expectations, it would be beneficial to further increase network throughput and increase network utilization. Hence, within the prior art, many techniques have been reported by telecommunications systems providers, original equipment manufacturers, and service providers. One such approach is the so-called "water-filling" algorithm for systems design and equalization strategies on communications channels. In the latter scenario, shaping of the transmission spectrum is undertaken to allocate increased power to channels with higher signal-to-noise ratios (SNR) in order to enhance capacity on these imperfect channels such as frequency-selective or ISI channels, multiple-input-multiple-output (MIMO) channels, or multiple-access channels.

Within many current communication systems therefore, such as cellular systems for example, significant bottlenecks are being or have been reached in the spectral efficiency achieved and users supported. Whitespace devices, Long Term Evolution (LTE), femtocells, automatic Wi-Fi handover, and optimized backhaul networks, are just some of the wide range of techniques being exploited to speed the flow of data to wireless devices by wireless operators. However, such techniques ultimately result in base stations and wireless access points that support a maximum number of users at a predetermined maximum data rate established by the appropriate standard against which the infrastructure has been implemented. For example, an LTE cell supports only 200 users per 5 MHz at approximately 10 Mb/s average downlink speed which given the number of users in typical urban environments can be seen to require a large number of cells, e.g. femtocells and picocells, and result in poor connectivity, dropped handovers, etc.

Recently, non-orthogonal signaling methods have been receiving some attention primarily as the result of revived interest in multi-carrier communications. For example, Kozek et al in "Non-Orthogonal Pulseshapes for Multicarrier Communications in Doubly Dispersive Channels" (IEEE J. Sel. Areas Comms., Vol. 16, pp. 1579-1589) showed that non-orthogonal signaling provides for reduced distortions on dispersive channels, i.e., increasing the channel-induced ISI performance. However, restricted only to Riesz based non-orthogonal functions, the reported performance on AWGN channels was still limited to that defined above. Additionally, some signaling schemes such as "Faster than Nyquist" (FTN) within the prior art signaling controlled ISI is known to be beneficial in shaping the spectrum of the transmitted signal and/or simplifying the signal processing at the transmitter/receiver. In FTN signaling, see for example Mazo in "Faster-than-Nyquist Signaling" (Bell Sys. Tech. J., Vol. 54, pp. 1451-1462) the objective is to increase the signaling rate slightly beyond the Nyquist rate without suffering any loss in minimum Euclidean distance between symbols.

Accordingly, it would be beneficial for such wireless networks to support variable allocations such that smaller and smaller frequency sub-bands are allocated to active users, as their number increases, but the individual users/nodes may insert more data-carrying signals in order to compensate for the loss of operating bandwidth arising from the accommodation of more users. It would also be beneficial for an active user within a network supporting a predetermined number of channels may dynamically access additional channels to support data transmission loading. It would further be beneficial for transmitters and receivers according to embodiments of such a network architecture to be based upon low cost design methodologies allowing their deployment within a wide range of applications including high volume, low cost consumer electronics for example.

Other aspects and features of the present invention will become apparent to those ordinarily skilled in the art upon review of the following description of specific embodiments of the invention in conjunction with the accompanying Figures.

SUMMARY OF THE INVENTION

It is an object of the present invention to data transmission systems, transmitters, and receivers and more particularly to data transmission over continuous-time channels affected by noise, fading, intersymbol interference, distortion, and/or bandwidth-limited constraints.

In accordance with an embodiment of the invention there is provided a communication system comprising:
a transmitter comprising:
  a covariance inducing module configured to accept blocks of transmission values and generate blocks of modulation values in dependence upon at least the blocks of transmission values; and
  a modulation unit coupled to the covariance inducing module configured to accept the blocks of the modulation values and form a corresponding transmission signal for transmission over a continuous channel in dependence upon at least the blocks of modulation values and a signalling signal; and a receiver comprising:
  a demodulation unit configured to accept a received signal from the continuous channel, and generate blocks of demodulated values in dependence upon at least the received signal; and
  a covariance—intersymbol interference (ISI) reducing module configured to accept the blocks of demodulated values and form decoded values in dependence upon at least the blocks of demodulated values, each decoded value being an estimate of a transmission value;
wherein the covariance inducing and covariance—ISI reducing modules are configured to apply to the transmission signal and remove from the received signal a predetermined intersymbol interference applied to a transmission established in dependence upon at least a multiplier factor K and a signal pulse characterized by at least a bandwidth B.

In accordance with an embodiment of the invention there is provided a transmitter comprising:
  a covariance inducing module configured to accept blocks of transmission values and generate blocks of modulation values in dependence upon at least the blocks of transmission values; and
  a modulation unit coupled to the covariance inducing module configured to accept the blocks of the modulation values and form a corresponding transmission signal for transmission over a continuous channel in dependence upon at least the blocks of modulation values and a signalling signal;
wherein the covariance inducing module is configured to apply to the transmission signal a predetermined covariance established in dependence upon at least a multiplier factor K and a signal pulse characterized by at least a bandwidth B.

In accordance with an embodiment of the invention there is provided a transmitter comprising:
  a first transmitter section for modulating first blocks of modulation values according to one or more modulation pulses $s_0(t), s_1(t), \ldots, s_{M-1}(t)$ with a rate of 1/T values per second; and
  a second transmitter section for communicating additional data in addition to the modulation values modulated by the first transmitter section by adding additional modulation pulses between the pulses generated by the first transmitter section.

In accordance with an embodiment of the invention there is provided a receiver comprising:
  a demodulation unit configured to accept a received signal from the continuous channel, and generate blocks of demodulated values in dependence upon at least the received signal; and
  a covariance—ISI reducing module configured to accept the blocks of demodulated values and form decoded values in dependence upon at least the blocks of demodulated values, each decoded value being an estimate of a transmission value;
wherein the covariance—ISI reducing module is configured to remove from the received signal a predetermined intersymbol interference applied to a transmission channel coupled to the continuous channel, the predetermined intersymbol interference established in dependence upon at least a multiplier factor K and a signal pulse characterized by at least a bandwidth B.

Other aspects and features of the present invention will become apparent to those ordinarily skilled in the art upon review of the following description of specific embodiments of the invention in conjunction with the accompanying Figures.

BRIEF DESCRIPTION OF THE DRAWINGS

Embodiments of the present invention will now be described, by way of example only, with reference to the attached Figures, wherein:

FIG. 24A depicts a multiplied rate broadcast receiver according to an embodiment of the invention exploiting a turbo equalization process;

FIG. 24B depicts a schematic model of an appropriate trellis description used to design the multiplied rate transmission MAP Equalizer in the multiplied rate broadcast receiver; and FIG. 25 depicts simulated BER and spectral efficiency for a multiplied rate broadcast receiver depicted in FIG. 24A according to an embodiment of the invention exploiting a turbo equalization process.

DETAILED DESCRIPTION

The present invention is directed to data transmission systems, transmitters, and receivers and more particularly to data transmission over continuous-time channels affected by noise, fading, intersymbol interference, distortion, and/or band-limited constraints.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It is being understood that various changes may be made in the function and arrangement of elements without departing from the spirit and scope as set forth in the appended claims.

A: Multiplied Rate Transmission

Figure 1:
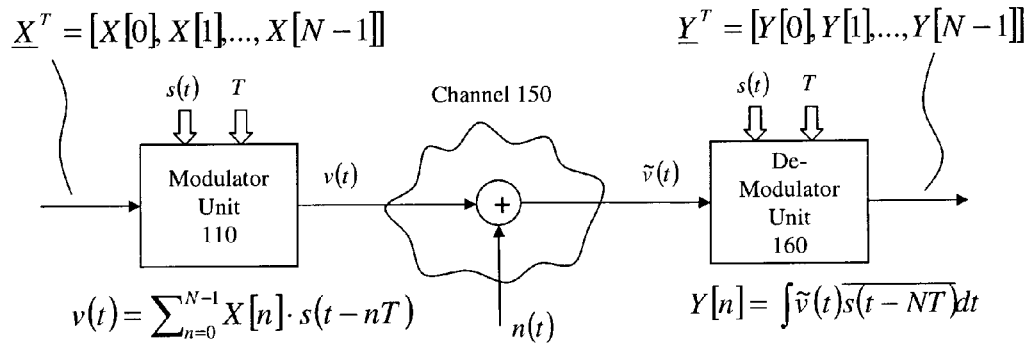
FIG. 1 depicts a block diagram of a conventional approach to signal modulation.
Figure 3:
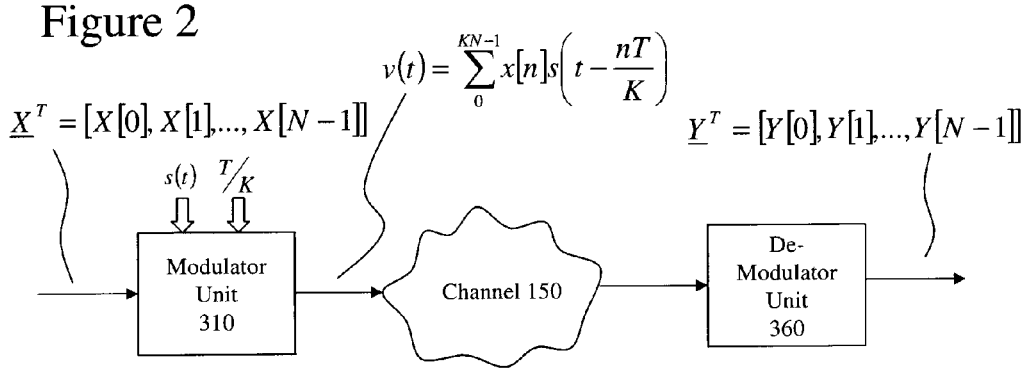
FIG. 3 depicts a block diagram of a multiplied rate signaling approach according to an embodiment of the invention.

A1: Point-to-Point Multiplied Transmission: Referring to FIG. 3, an approach to data communications according to an embodiment of the invention is depicted wherein a transmitter (not shown for clarity) comprising at least a Modulator Unit 310 transmits data over a Channel 150 to a receiver (not shown for clarity) comprising at least a De-Modulator Unit 360. Approaches according to embodiments of the invention exploit a signaling pulse, for instance a pulse used in a conventional signaling approach as shown in FIG. 1, which may correspond to a signaling period based on the spectral extent (bandwidth) W of the signaling pulse, so that the signaling period satisfies the Nyquist criterion, $T \geq \frac{1}{2}W$. However, rather than modulating a block of N modulation values over a series of N intervals spaced by T units of time, the signaling approach uses a signaling rate multiplied by $K \geq 1$. Accordingly, a block of KN modulation values are transmitted in effectively the same time interval of NT seconds, and individual modulation values are sent every T/K seconds, in general, which does not satisfy the Nyquist criterion. For the sake of clarity within the specification such signaling is referred to as multiplied rate signaling and communications according to such signaling is referred to as multiplied rate transmission (MRT).

Within the following description in respect of embodiments of the invention in order to simplify the description, the system is described as involving a single modulation pulse shape, s(t). However, it should be understood that other signal formats may be employed, including, but not limited to, for example multiple different pulses of the same/similar bandwidth, i.e. $s_1(t), s_2(t), \ldots, s_{KN}(t)$, may also be utilized by the modulator at the same time, such as sine and cosine in QAM modulation or phase-shifted waveforms in PSK systems. As depicted in FIG. 3, a representative block of modulation values $\underline{x}^T=[x[0], x[1], \ldots, x[KN-1]]$ is passed to the Modulation Unit 310 which generates a continuous time signal, v(t), as defined by Equation (3) as its output and receives in addition to the modulation values the modulation pulse s(t) and clock T/K. In general, the signaling pulse s(t) has significant levels outside the range t ∈ [−T/2K,T/2K], and therefore the terms in the sum overlap in time. According to some embodiments of the invention, Modulation Unit 310 may differ from a conventional modulation unit, e.g. Modulation Unit 110, as depicted in FIG. 1 to account for this overlap of terms. For example, a bank of K separate modulation units may be employed, each offset by T/K, and their outputs summed to form v(t). For the sake of simplifying the descriptions within this specification, integer values of K are described. However, it would be evident that K may not be an integer, e.g. $K=\frac{5}{3}$ or $K=\sqrt{5}$. In the case of non-integer values of K, the number of modulation values in a block may be limited to an integer value not greater than KN.

$$v(t) = \sum_{0}^{KN-1} x[n]s\left(t - \frac{nT}{K}\right) \quad (3)$$

Figure 2:
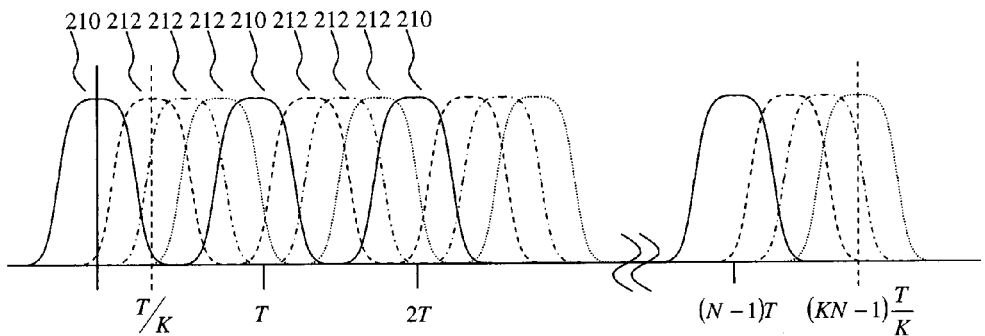
FIG. 2 depicts an illustration of a time waveform of a modulation of a block of data according to an embodiment of the invention.

As depicted in FIG. 2, N modulated pulses 210, as might be formed in a conventional system of FIG. 1, are shown in solid lines. The system of FIG. 3 introduces additional pulses 212 spaced more closely in time. For example, as depicted in FIG. 2, K=4 is illustrated which means that there are four modulated pulses every T seconds, or effectively, an additional K−1=3 pulses 212 are added for every modulated pulse of the conventional approach. It would be evident that rather than introducing additional pulses in an existing signal, other embodiments of the invention may be implemented by the modulating unit effectively spacing the data carrying pulses closer in time at T/K increments instead of T increments.

The Demodulator Unit 360 implements a sampling of the matched filter output every T/K seconds. Accordingly, in some embodiments of the invention the Demodulator Unit 360 differs from the Demodulator Unit 160 of a conventional receiver to account for the overlapping modulated pulses of successive modulation values, for example, by implementing a bank of K matched filters, each of which is sampled at offset times at a period T, each offset by a time T/K. Alternatively Demodulator Unit 360 implements a bank of K matched filters each with an impulse response of T/K seconds only. Each matched filter response being on orthonormal bases spanning the transmitted MRT signals in each subinterval of length T/K. Such orthonormal bases may be obtained by first subdividing a modulating pulse in time into K sub-pulses of length T/K and by taking the Gram-Schmidt orthonormalization procedure over the K sub-pulses. The number of orthonormal bases for each subinterval depends on the linear dependence of the K sub-pulses and the total number of outputs from the K matched filter bank in each T second is at least K and at most $K^2$. In practice, the Gram-Schmidt orthonormalization may be computed algebraically or numerically using, for example, QR factorization algorithm.

A2: Multiplied Rate Transmission in Vector Matrix Form: In order to outline approaches according to embodiments of the invention this section presents Multiplied Rate Transmission (MRT) mathematically in vector matrix form. Accordingly, the communication of a block $\underline{x}$ of KN modulation values to yield a block $\underline{y}$ of KN received values may be represented in vector-matrix form as $\underline{y}=H\underline{x}+\underline{n}$ where $H=[h_{ij}]$ and the (i,j)th matrix element $h_{ij}$ depends on the degree of overlap of the modulation pulse for the i th value and the j th value as defined by Equation (4), where $\bar{s}(t)$ denotes the complex conjugate of s(t) in the case of complex signals. In general, this results in H having a diagonal with all "1"s and off-diagonal terms depending on |i−j|. The additive noise factor n has a covariance matrix equal or proportional to $(N_0/2)H$ resulting from the overlap of the modulation pulses resulting in the overlap filtering of the additive noise n(t) with power spectral density $N_0/2$ at the receiver matched filter(s). Based upon the matrix form relating $\underline{y}$ and $\underline{x}$, an upper bound on communication capacity per second can be defined by Equation (5), c.f. Equation (1), for the case of AWGN with power spectral density $N_0/2$, where det(•) denotes the matrix determinant, Q denotes the covariance of modulation values $\underline{x}$, and $1_{KN}$ denotes the KN×KN identity matrix. In any T second interval the multiplied rate system has a spectral efficiency to transmit approximately, e.g. for large N, the number of bits defined by Equation (5). In order to achieve or approach the upper bound communication capacity, $C_K$, it is desirable to have the statistics of the block of NK modulation values, $\underline{x}$, be zero mean and have a covariance equal to $(E_S/k)H^{-1}$ where $E_S$ represents the average expected squared norm of the transmission signal v(t) per T second interval, which results in $H\underline{x}$ having a covariance proportional to H.

$$h_{ij} = \int s(t)\bar{s}\left(t - |i - j|\frac{T}{K}\right)dt \quad (4)$$

$$C_K = \lim_{N \to \infty} \frac{1}{NT} \log_2 \det\left(I_{KN} + \frac{QH}{N_0/2}\right) \quad (5)$$

Figure 4:
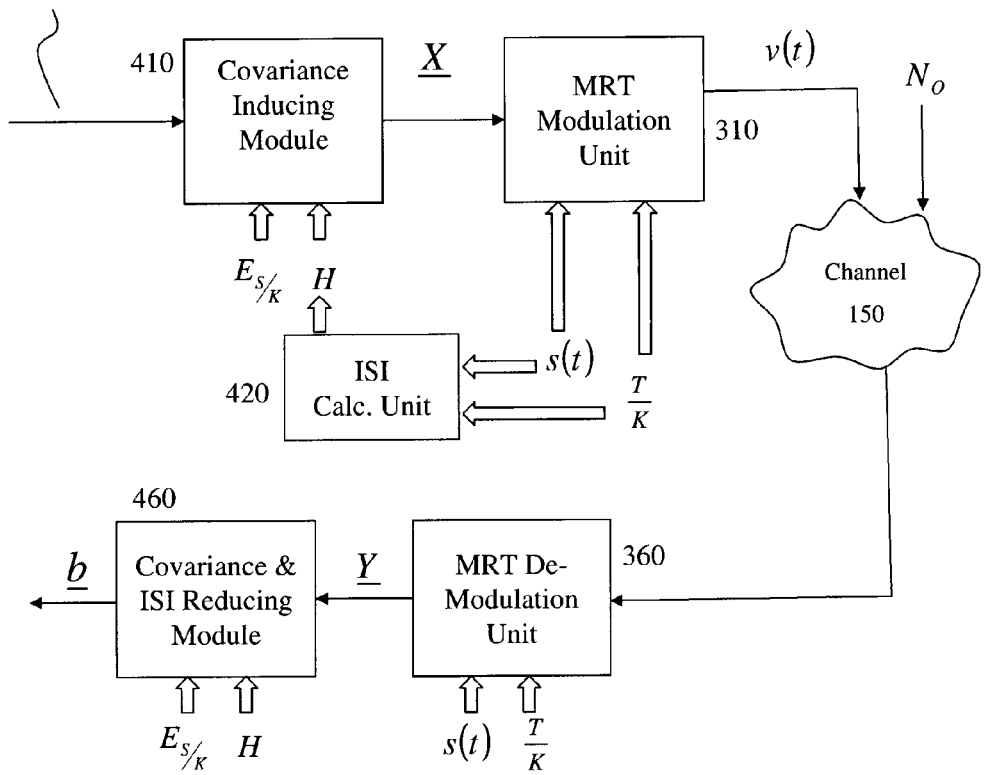
FIG. 4 depicts a block diagram of a multiplied rate signal approach with a covariance inducing and a covariance and ISI reducing module according to an embodiment of the invention.

Now referring to FIG. 4, there is depicted a schematic of a transmission system according to an embodiment of the invention wherein an input block of zero mean, independent, unit variance transmission values $\underline{a}^T=[a[0], a[1], \ldots, a[KN-1]]$ are converted to the modulation values with the desired covariance by Covariance Inducing Module 410 performing matrix multiplication $\underline{x}=P\underline{a}$ where $P=\sqrt{(E_S/K)}H^{-1}$. After modulation onto the carrier signal pulse in Modulation Unit 310 and transmission through the network, shown as Channel 150 with AWGN, the received signal is converted initially by De-Modulation Unit 360. The received signal is processed by Covariance and ISI Reducing Module 460 which performs the inverse of the operation $\underline{b}=P^{\dagger}\underline{y}$ where $P^{\dagger}$ is the Hermitian transpose of P.

More generally, P can be any matrix satisfying Equation (6) such that P can be found by one or methods including, for example, Choleski decomposition, singular value decomposition, and eigenvalue decomposition. Accordingly, the Covariance Inducing Module 410 and the Covariance and ISI Reducing Module 460 jointly cancel out the effect of the matrix H as evident from Equation (7).

$$PP^{\dagger} = \frac{E_S}{K}H^{-1} \qquad (6)$$

$$P^{\dagger}HP = P^{\dagger}\left(\frac{E_S}{K}(P^{\dagger})^{-1}P^{-1}\right)P = \frac{E_S}{K}I \qquad (7)$$

In some embodiments of the invention, the signaling rate multiplier, K, may be chosen, modified or adapted during design, configuration, or operation of the system for example. In general, the modulation pulse shape s(t) is constant during operation, although in principle in some embodiments, the modulation pulse shape may be adapted or selected from a set of predetermined pulse profiles during operation. The covariance matrix P, and corresponding decoding matrix, $P^{\dagger}$, depend on H, which in turn depends on s(t) and T/K. As depicted in FIG. 4 s(t) and T/K are coupled to Modulation Unit 310 and ISI. Calc. Unit 420 which generates H for coupling to Covariance Inducing Module 410. In embodiments in which K and, optionally, the pulse shape s(t)) are modified or adapted, then the covariance matrix P may be changed accordingly.

In some embodiments of the invention, the ISI interference matrix, H, depends on factors in addition to the overlap of the modulation pulses for successive modulation values. For example, characteristics of the channel, for instance represented as an impulse response, may be known in advance, estimated by the receiver, or otherwise obtained. In such cases, the combination of channel characteristics and effect of the overlap of the modulation pulses are used to determine H, which in turn is used to determine the covariance matrix P. For example, the receiver may provide an estimate of H to the transmitter, which uses that estimate to determine the covariance matrix through an initial network discovery step or based upon the initial employment of default configuration settings for example.

It would be evident to one skilled in the art that the approach described supra and with reference to FIG. 4 represents one possible implementation of a Covariance Inducing Module 410 and its corresponding covariance and ISI Reducing Module 460. It would be evident that other implementations of the covariance inducing module or system element may be implemented without departing from the scope of the invention. Optionally, a Channel Estimation Module may also be provided connected to the ISI Calc. Unit 420 and MRT Demodulation Unit 360.

It would be evident that the covariance matrix form introduced above is not required for operation of systems according to embodiments of the invention and that in some embodiments, no precoding is used, or a modified form of precoding is used. Although the matrix form introduced above is associated with achieving an optimal communication rate, advantages over the K=1 conventional system may be achieved with other precoding matrices. The basis for using a different covariance matrix, or other types of precoders, may be to provide improved numerical properties. For instance, for certain modulation pulse shapes, e.g. a sinc(t) function, the ISI interference matrix H may be ill-conditioned.

In some embodiments of the invention, the value of K may be adapted according to channel conditions, such as for example the additive noise power spectral density, $N_0$, of the channel. For instance, if the number of bits of the information stream that are encoded in each transmission value is fixed (or can be selected for a relatively small set of values), the value of K may be adapted to best approach the optimal spectral efficiency. Hence, in some embodiments of the invention, as $N_0$ decreases the multiplier K may be increased by a commensurate amount. Optionally, the receiver provides the transmitter with an estimate of the noise level, and the transmitter adapts the multiplier (and optionally the encodings approach affecting the number of encoded bits per transmission value). In other embodiments other directly or indirectly measured characteristics of the transmission channel are fed back to the transmitter, which adapts the multiplier according to the feedback. An example of an indirect measure of the transmission channel is an error rate on the decoded transmission values.

It would be evident that depending on the nature of the modulation pulse, changing K and/or pre-coding with matrix P changes the power spectrum of the transmission signal v(t). In some embodiments of the invention increasing K may increase the bandwidth that contains a fixed portion of the power of the transmission signal. In some embodiments of the invention the bandwidth available for the transmission signal on the channel may be limited, and in turn, the maximum value of the multiplier K may be limited. Accordingly, the channel bandwidth may be a directly or indirectly measured channel characteristic that affects selection of the multiplier K and pre-coding matrix P.

Figure 5A:
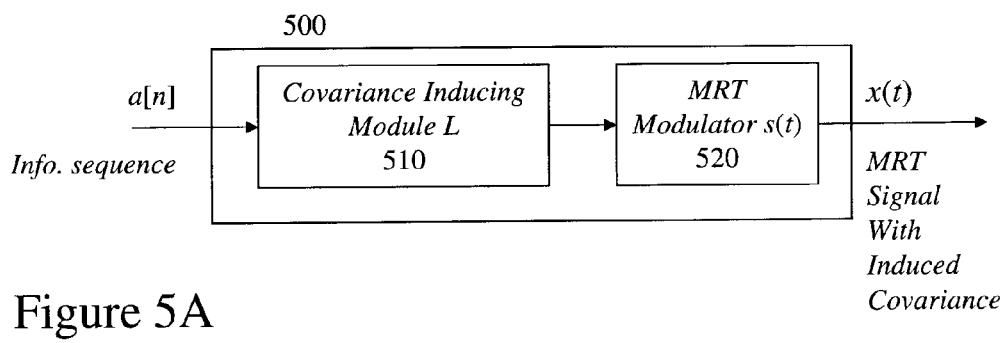
FIG. 5A depicts a schematic of a baseband multiple rate source according to an embodiment of the invention exploiting a linear time-invariant transmit filter.
Figure 5B:
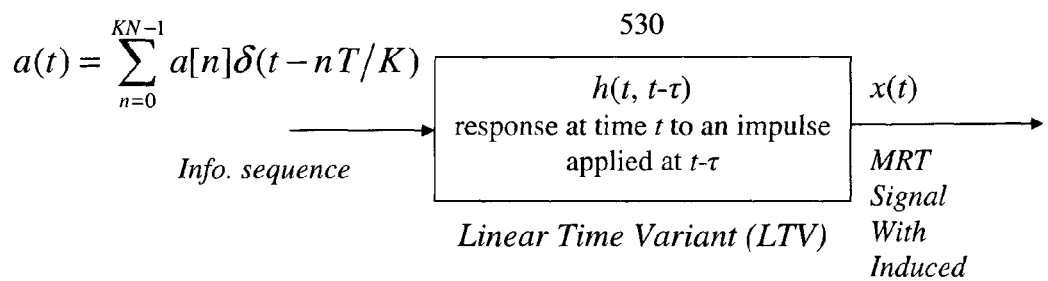
FIGS. 5B and 5C depict schematics of alternative baseband multiple rate transmission transmitters according to an embodiment of the invention exploiting a linear time-varying transmit filter.
Figure 5C:
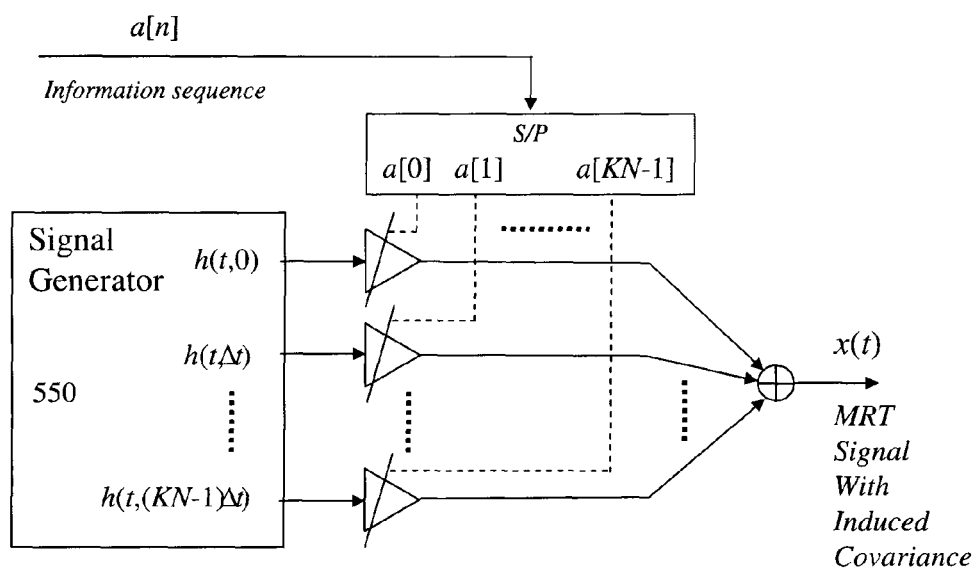

A3: Multiplied Rate Transmitter and Receiver Architectures: Within the description supra in respect of embodiments of the invention and FIGS. 2 through 4 and as depicted in FIG. 5A, baseband MRT transmitters (or sources) have been described as operating on the basis of a Covariance Inducing Module 510 followed by a MRT Modulator 520 which operates as a linear time-invariant (LTI) transmit filter. Optionally, the Covariance Inducing Module 510 may operate as a prescribed look-up table or as a specific matrix multiplier and it would also be evident that other alternative implementations may be employed based upon non-LTI approaches and without the requirement for a Covariance Inducing Module 510. Two such alternative implementations are depicted in FIGS. 5B and 5C respectively. FIG. 5B depicts a one-stage implementation linear time-varying transmit filter with an impulse response h(t, t−τ). This impulse response is such that it combines the joint effect of introducing the desired covariance into the transmitted data stream and LTI transmit filtering. According to an embodiment of the invention it can be described by Equations (8A) through (8C) respectively for Δt=T/K where s(t) is the transmit pulse shape and L(i,j) being the (i,j)-th entry of the covariance inducing matrix L.

$$h(t, 0) = \sum_{n=0}^{KN-1} L(n, 0)s(t - n\Delta t) \quad (8A)$$

$$h(t, \Delta t) = \sum_{n=0}^{KN-1} L(n, 1)s(t - n\Delta t) \quad (8B)$$

$$h(t, (KN-1)\Delta t) = \sum_{n=0}^{KN-1} L(n, KN-1)s(t - n\Delta t) \quad (8C)$$

Figure 7:
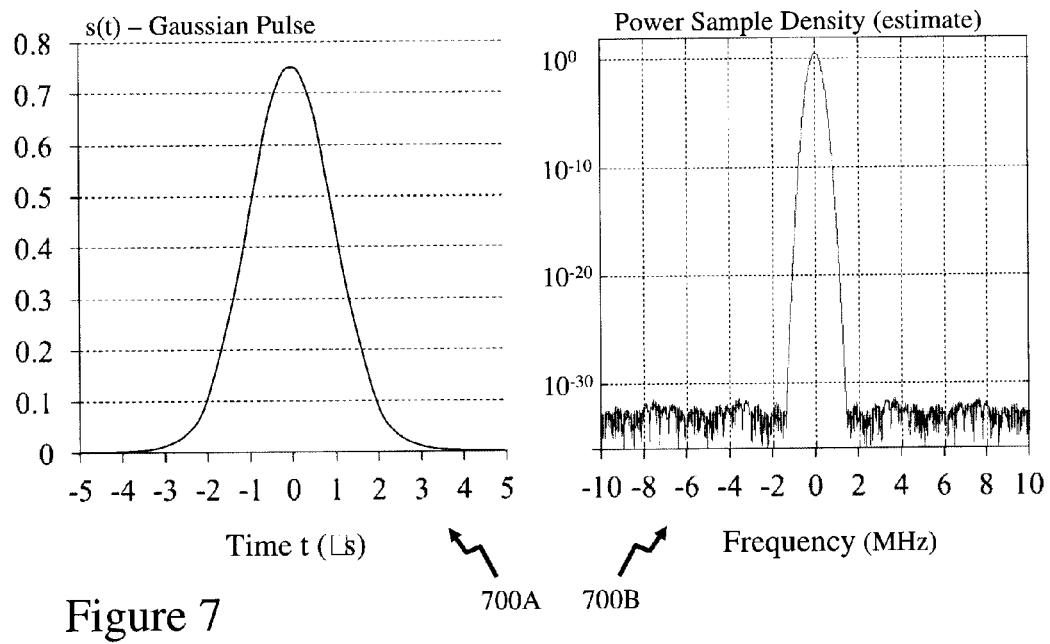
FIG. 7 depicts an example of a time-truncated Gaussian transmit pulse in time and frequency domains supporting multiple rate transmissions according to embodiments of the invention.
Figure 8A:
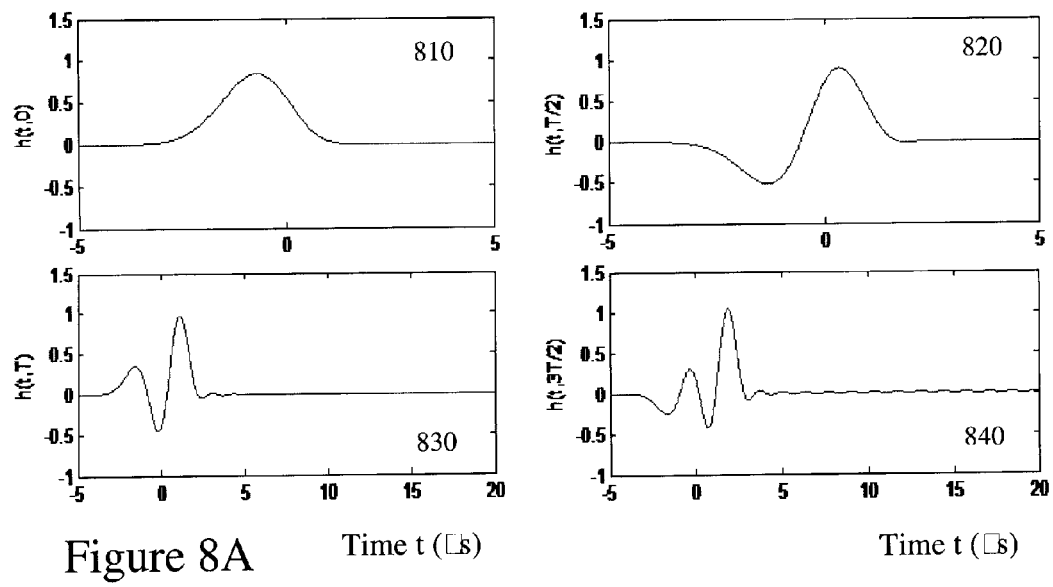
FIGS. 8A and 8B depict time-varying modulation signals according to an embodiment of the invention.
Figure 8B:
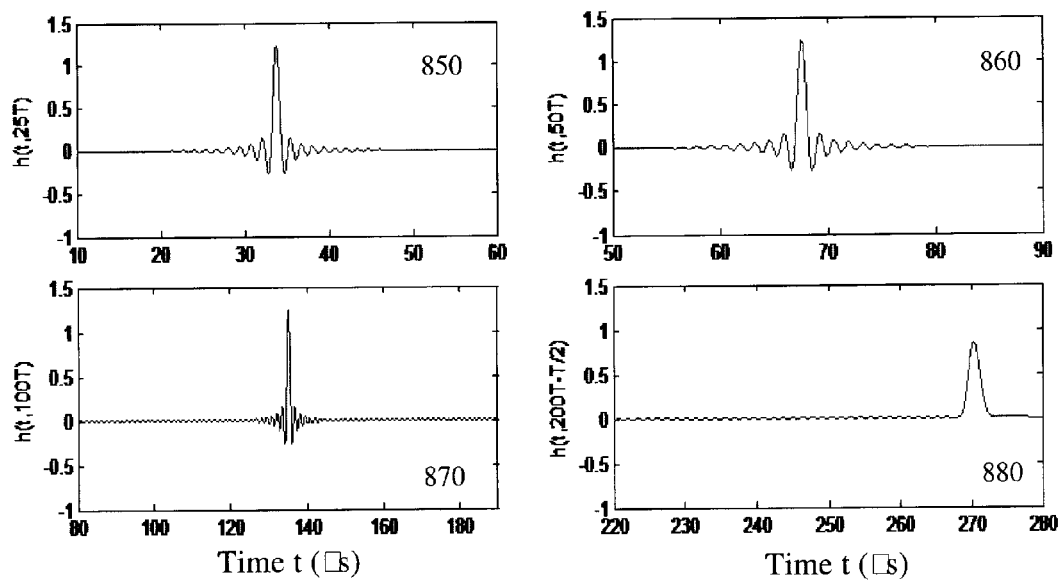

It would be evident to one skilled in the art that these waveforms may be calculated in advance and their samples stored within a memory element, e.g. RAM, ROM, EEPROM for example off-line and their samples can be stored in the computer memory such as ROM. Referring to FIG. 7 there are depicted first and second graphs 700A and 700B respectively depicting a time-truncated Gaussian modulation pulse shape s(t) in the time and frequency domains respectively wherein for a variance of $\sigma^2=1$, 99.9% of the energy is contained within the frequency range −0.37 MHz≤f≤0.37 MHz. Examples of the resulting time-varying waveforms h(t, t−τ) when a time-truncated Gaussian modulation pulse shape are shown by first to eighth graphs 810 to 880 respectively in FIGS. 8A and 8B representing t−τ=0; T/2; T; 3 T/2; 25 T; 50 T; 100 T; 200 T−T/2 for K=2 and N=200 MRT signaling. For these simulations, the Nyquist time-intervals T is set to T=1/(2 $W_{99.9\%}$)=1.3514 µs.

Now referring to FIG. 5C, there is depicted another one-stage implementation for an alternative implementation of an MRT transmitter according to an embodiment of the invention where a Signal Generator 550 is employed to modulate the original, uncorrelated data stream a[0], a[1], a[2], . . . , a[KN−1]. Again, this MRT transmitter implementation combines into one step the joint effect of introducing desired covariance into the transmitted data stream and LTI transmit filtering from FIG. 5A.

Figure 6A:
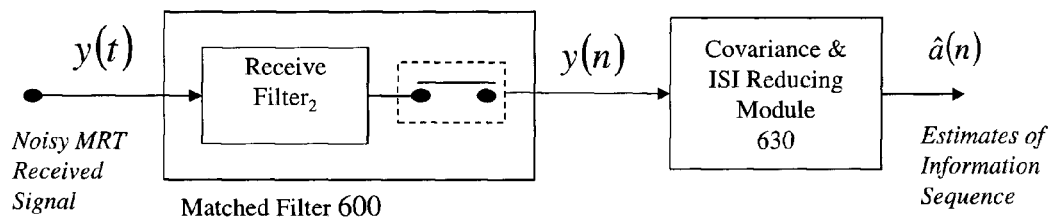
FIG. 6A depicts a schematic of a multiplied rate receiver according to an embodiment of the invention exploiting a matched filter methodology and a covariance and ISI reducing module.
Figure 6B:
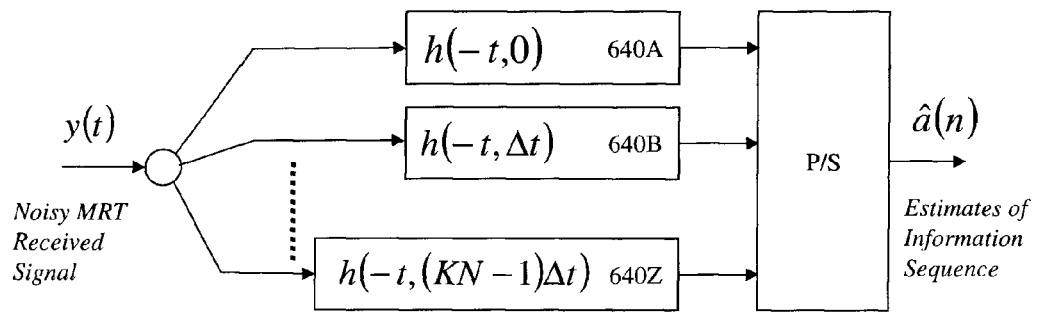
FIGS. 6B and 6C depict alternative implementations of multiplied rate receivers according to embodiments of the inventions exploiting matched filter banks and time-varying correlators followed by integrators.
Figure 6C:
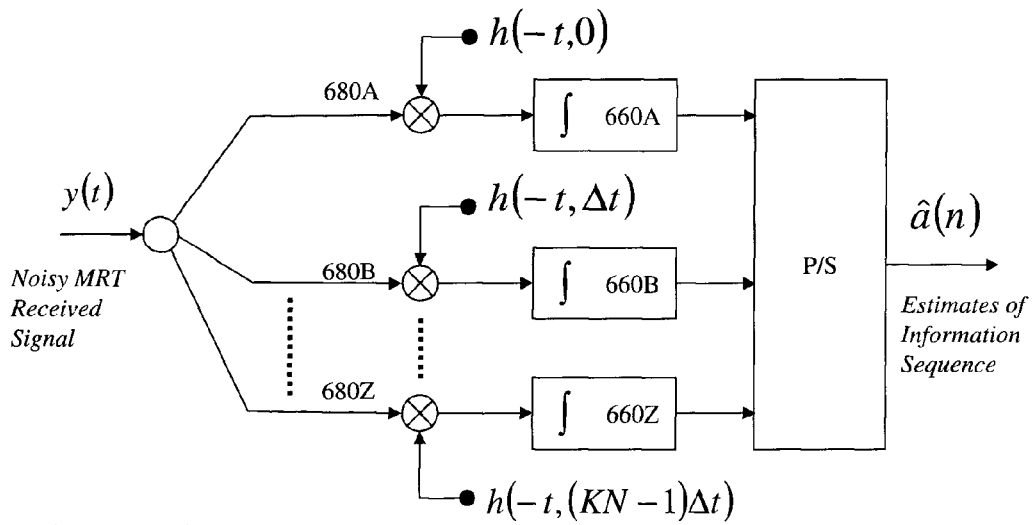

Within the description supra, in respect of embodiments of the invention together with FIG. 4 and as depicted in FIG. 6A, MRT receivers have been described as operating on the basis of a Matched filter 600 followed by a Covariance and ISI Reducing Module 630 that uses covariance structure of the MRT data stream. However, it would be evident that equivalent alternative MRT receiver implementations may be based upon a bank of matched filters 640A through 640Z or time-varying correlators 680A through 680C followed by integrators 660A through 660Z such as depicted in FIGS. 6B and 6C respectively. The correlators use the time-varying waveforms h(t, t−τ). Accordingly, embodiments of these may be implemented, for example, using hardware, digital signal processing filter banks, and other signal processing methods.

The equivalent transmitter and receiver implementations described in respect of FIGS. 5A to 5C and 6A to 6C may work interchangeably, e.g. the transmitter implementation from FIG. 5A may work with the receiver implementation from FIG. 6(C), etc.

Figure 9A:
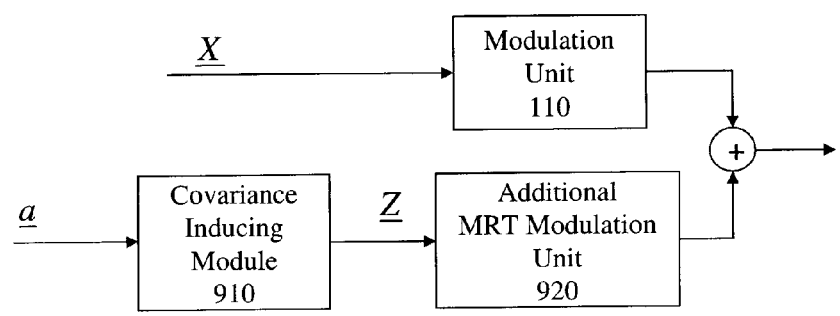
FIG. 9A depicts a block diagram of a transmitter for a combined base rate and multiplied rate signaling approach according to an embodiment of the invention.

A4: Multiplied Rate Transmission Transmitter/Receiver Conceptual Visualization: According to some embodiments of the invention, the methodology of multiplied rate coding may combined with a conventional prior art system. Such an embodiment being presented in FIG. 9A, a conventional Modulation Unit 110 accepts blocks of modulation values, x, and transmits a waveform that includes a series of modulated pulses, e.g. modulated pulse 210, at intervals T. Additional data may be transmitted on the same channel by adding additional multiplied rate pulses, e.g. additional pulses 212 between the modulated pulses 210. In some embodiments, these blocks of additional data, a, are passed through a Covariance Inducing Module 910 forming blocks of modulation values, z, which are passed through an Additional Modulation Unit 920. The outputs from the Modulation Unit 110 and Additional Modulation Unit 920 are then combined for transmission. In some embodiments of the invention, the Modulation Unit 110 and Additional Modulation Unit 920 use the same signaling pulses s(t), although in other embodiments of the invention, different signaling pulse profiles may be employed for the Modulation Unit 110 and Additional Modulation Unit 920 respectively.

Figure 9B:
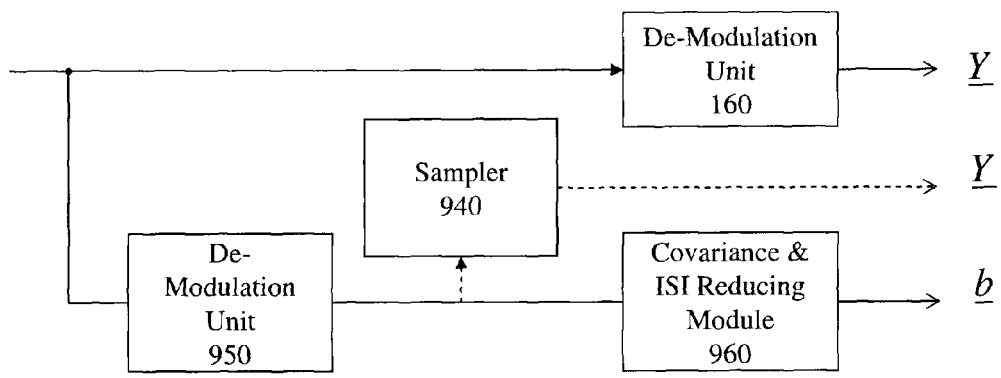
FIG. 9B depicts a block diagram for a corresponding receiver for combined base rate and multiple rate signaling approach according to an embodiment of the invention.

Referring to FIG. 9B, representing part of a receiver according to an embodiment of the invention, a Demodulation Unit 950 implements, for example, a matched filter sampled at intervals T/K. In other embodiments of the invention other receiver front ends, for instance a correlator receiver, may be used whilst in others a Sampler 940 samples every $K^{th}$ sample to recover, y, an estimate of the original modulation values, x. A Covariance and ISI Reducing Module 960 is used to yield an estimate, b, of the additional transmission values. In other embodiments of the invention, the estimates of the original modulation values y are instead determined directly from a conventional demodulation unit, such as De-Modulator Unit 110. However, in other embodiments, the estimate of the original modulation values y may be determined from the output of the Covariance and ISI Reducing Module 960 (not shown).

Figure 10:
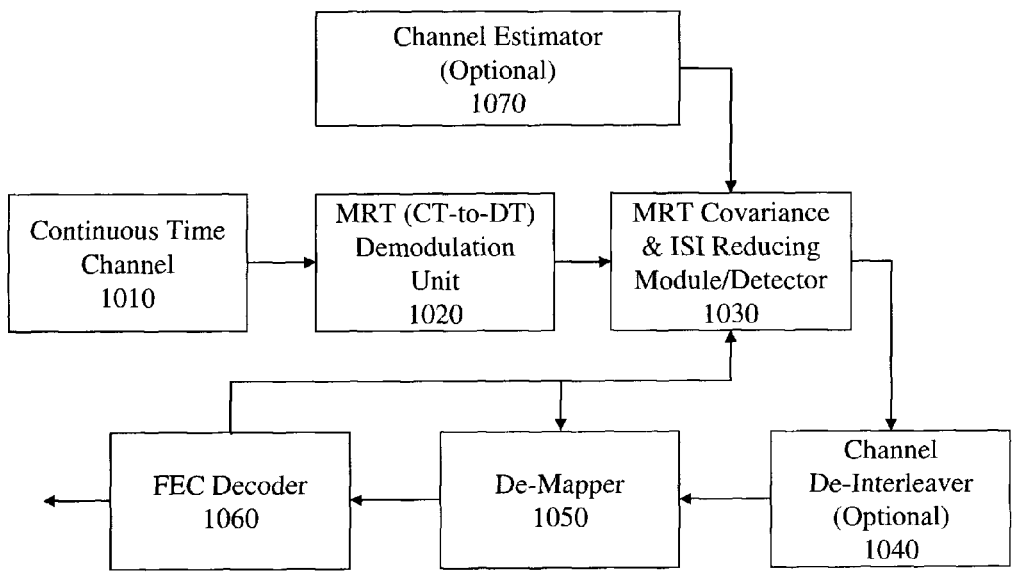
FIG. 10 depicts a block diagram of an iterative receiver according to an embodiment of the invention.

Such a receiver architecture as depicted in FIG. 9B allows the methodology of multiplied rate coding according to embodiments of the invention to be combined with a conventional prior art system. This receiver architecture may form part of a "feed-through" receiver wherein the demodulated data after passing through to Covariance & ISI Reducing Module 960 is fed into an error control decoder. Such error-control decoder can play a key role in telecommunication systems as they allow for the removal of residual channel noise and interference. Accordingly, to other embodiments of the invention, an iterative receiver architecture such as depicted in FIG. 10 may be employed wherein noise and MRT interference are removed through the iterative steps between the forward error-control (FEC) Decoder 1060 and the MRT Decoder/Detector 1030. As depicted, data received from a communications channel, shown as Continuous Time Channel 1010, is initially converted via a MRT (Continuous Time to Discrete Time) Demodulation Unit 1020 before being coupled to the MRT Covariance and ISI Reducing Module/Detector 1030. The MRT Covariance and ISI Reducing Module/Detector 1030 optionally receives data from Channel Estimator 1010 which may be employed in determining when the iterative decoding is complete. The output decoded data is coupled from the MRT Covariance and ISI Reducing Module/Detector 1030 to De-Mapper 1050 either directly or via an optional Channel De-Interleaver 1040. The output from the De-Mapper 1050 is then coupled to the FEC Decoder 1060 wherein the error-corrected output is coupled out from the receiver. Data from the FEC Decoder 1060 in addition to being fed-back to MRT Covariance and ISI Reducing Module/Detector 1030 is also coupled to the De-Mapper 1050.

Within the embodiments described supra, to date the approaches have been based upon time-dependent separation of the multiplied rate coded data. However, in other embodiments of the invention, the multiple rate coded data may be extracted based upon phase separation or frequency separation, for example. Optionally, other embodiments of the invention may exploit frequency overlapped MRT signals. Considering the MRT modulated signal as being structured as m sequences of data x[m+nK], where m=0, 1, 2, ..., K−1, then the signal v(t) can be seen to be composed of K Nyquist rate sub-signals in Equation (9) which when Fourier transformed, can be seen to have different (frequency domain) phase as evident in Equation (10) where V(f) and S(f) are the Fourier transforms of v(t) and s(t) respectively with phases denoted by $\{\phi_k = kT/K; k=0, 1, ..., K-1\}$. The implementation of such a receiver would be by a phase separation filter implemented using digital and/or analog filter techniques.

$$v(t) = \sum_{n=0}^{N-1} x[m+nK]s\left(t - nT - \frac{mT}{K}\right) \text{ where } m = 0, 1, 2, \ldots K-1 \quad (9)$$

$$V(f) = \sum_{m=0}^{K-1}\left(\sum_{n=0}^{N-1}(x[m+nK]S(f)e^{-j2\pi f nT})e^{-j2\pi f \phi_m}\right) \quad (10)$$

A5: Extension to Multi-Access Channels Communication with Multiple Users: As described supra, Multiplied Rate Transmission (MRT) provides a methodology and apparatus for transmission between a transmitter and a receiver. However, embodiments of the invention also support multi-user transmission over continuous-time multiple access channels using the technologies such as, but are not limited to, frequency-division multiplexing access (FDMA) and time-division multiplexing access (TDMA). In each case, the individual user's data is independently modulated with respect to the other users in an assigned frequency or time slot. Accordingly, embodiments of the invention allow for increasing the achieved data rate within this time slot or frequency slot by transmitting symbols at controlled time instances and with controlled amount of input covariance, thus achieving increased data rates for the TDMA or FDMA users. Given, that the spectral efficiency of MRT according to embodiments of the invention may be increased continuously by increasing K, $\eta=C_K/W$, then it would be evident that the use of the MRT methodology within an FDMA system, where smaller and smaller frequency sub-bands are allocated to active users, as their number increases and the individual users/nodes may insert more data-carrying signals in order to compensate for the loss of operating bandwidth arising from the accommodation of more users. Such an approach may be dynamic as described supra.

As a result, a large number of fixed rate users may be supported by a service provider who has acquired only a limited bandwidth, e.g. by cable modem or 4G wireless transmission. In case of TDMA transmission, the users can transmit significantly more data in their time slot due to the MRT technology. Consequently, a scheme may be considered re-distributing unused time-slots due to increased data rate, so these can be used by additional TDMA network users. Similarly, multi-user communication systems based on Code Division Multiple Access (CDMA) can significantly increase their data rate by inserting several signals into the chip/bit interval as proposed according to embodiments of the invention. In CDMA and/or random access technology, the data for each user is corrupted by additive channel noise and multi-user interference within the network. Accordingly, a receiver is slightly modified to remove or suppress the multi-user interference from the desired user's data as well as adequately removing the introduced ISI in each transmitted signal. Multi-user interference may be removed or suppressed by using an adequate multi-access demodulator, e.g. Minimum Mean Square Error (MMSE) decoder or de-correlator. Upon multi-user interference removal, each user's information is processed as in the single-user case.

An alternative embodiment to the receiver for multi-access channel applications consists of initially removing the induced covariance and ISI from the combined signals of all the users by treating the ensemble of users as one super-user, followed by employing a multi-access demodulator for removal or suppression of the excess multi-user interference. It would be evident to one skilled in the art that with multiple-access channels the sum-spectral efficiency increases linearly with the number of active users/nodes as opposed to logarithmically enabled growth with the current state of the art communication system methodologies.

It would be evident to one skilled in the art that embodiments of the invention when applied to multi-node transmissions over continuous-time channels may be applied in one or more scenarios, including but not limited to, symmetric/non-symmetric users where different users use different input signaling and rates, channels affected with AWGN and non-AWGN noise, cooperative/non-cooperative users where users data may be intentionally correlated or independent, synchronous/asynchronous users where users may start at different time instances, CDMA with Gaussian and Non-Gaussian multi-user interference, and CDMA with joint (multi-user) and single-user demodulation/decoding.

B: Multiplied Rate Transmission Transmitter/Receiver Architecture Overview

Figure 11:
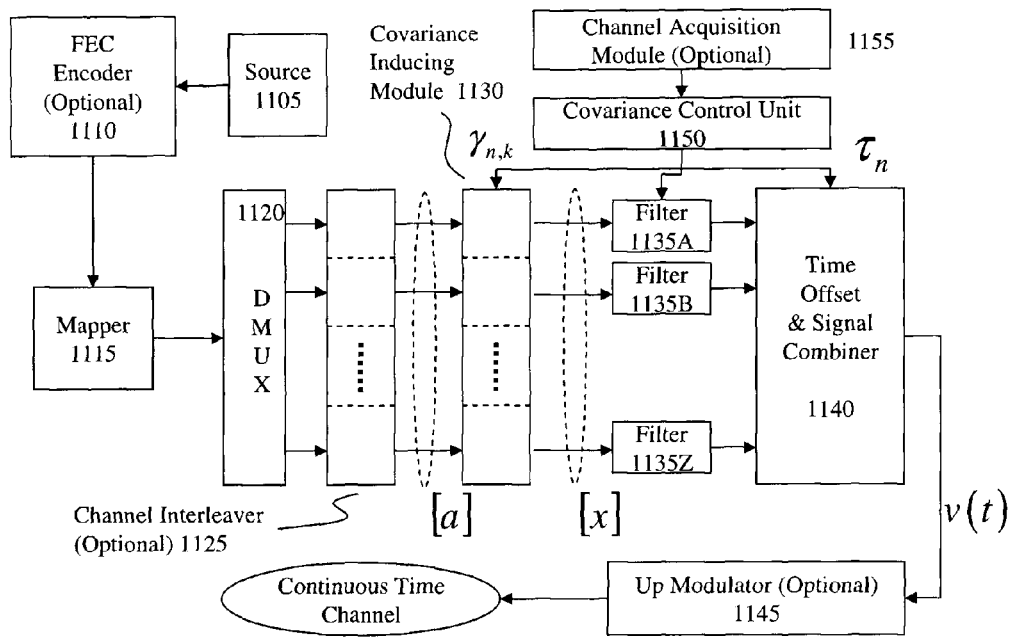
FIG. 11 depicts a block diagram of a multiplied rate transmitter architecture according to an embodiment of the invention.

B1. Multiple Rate Transmission Transmitter: Referring to FIG. 11, there is depicted an exemplary Multiple Rate Transmission (MRT) Transmitter (Tx) (MRT-Tx) according to an embodiment of the present invention. As depicted, information symbols are obtained from a Source 1105 which are then encoded by Forward Error Correction (FEC) Encoder 1110 for increased robustness against the noise, channel distortion and/or multi-user interference present within the transmission channel. The encoded symbols are subsequently mapped into a desired discrete-time modulation symbols by Mapper 1115 before being coupled to De-Multiplexer (DMUX) 1120 which divides a stream of incoming symbols into Z parallel sub-streams, wherein the number of parallel branches at the output of the DMUX 1120 corresponds to the length of a channel data packet, N. The parallel outputs of the DMUX 1120 are optionally interleaved by Channel Interleaver 1125, e.g. in order to break up deep fades that can occur on wireless communication channels or for other purposes beneficial to the system performance. Channel Interleaver 1125 output is denoted by a[n] for n ∈ [0,N−1] or by [a]/a, where a=[a[0], a[1], ..., a[N−1]] in vector notation. The channel interleaving is optional and can be performed either within a packet or across multiple packets, depending on the desired level of protection against channel fade for example.

The Covariance Control Unit 1150 first determines the ISI effect caused collectively by the desired signaling rate, non-orthogonality of the signal set and waveforms, the physical channel impulse response h(t), and the filtering and sampling performed at the receiver. Subsequently, the Covariance Control Unit 1150 determines the desired level of covariance to be induced on the modulation values which depends on the predetermined level and form of the ISI. The Covariance Control Unit 1150 may also use the channel SNR or noise power values, if available, to perform any power adjustment, e.g. using a water-filling algorithm. Further, in order to control the amount and form of ISI inserted into the transmission signal, the Covariance Control Unit 1150 may also adaptively adjust the signaling rate, modify the transmit filter response and/or control the time instances where the signal is to be inserted.

Once the utilized form of covariance is determined, the Covariance Control Unit 1150 calculates weighting coefficients, $\{\gamma_{n,k}\}$, to be used by the Covariance Inducing Module 1130 to induce the desired covariance into the modulation symbols. These coefficients $\{\gamma_{n,k}\}$ may be stored within a covariance matrix or another appropriate format and their calculation can be accomplished using optimization tools known in the art from information theory. Nonetheless, fixed values of the weighting coefficients may be employed. The Covariance Inducing Module 1130 performs weighted linear combination of input data arriving from the Channel Interleaver 725 using the weights determined by the Covariance Control Unit 1150. Accordingly, the Covariance Inducing Module 1130 generates outputs $$x[n] = \sum_{k=0}^{N-1} \gamma_{n,k} a_k \text{ for all } n \in [0, N-1].$$

The parallel data outputs of the Covariance Inducing Module 1130 are then individually filtered by the bank of (transmit) modulation filters 1135A through 1135Z. The modulation filters 1135A through 1135Z may be fixed or adaptively modified by the Covariance Control Unit 1150 and its impulse response is denoted by s (t) if it is a continuous-time filter or by s[n] if the filter is implemented in discrete-time domain. Subsequently, the parallel streams of filtered signals are temporally combined to one stream by Time Offset & Signal Combiner 1140 where the appropriate delays may be calculated/determined by the Covariance Control Unit 1150 based on the information from a Channel Acquisition Module 1155. The delays are used to place the modulated signals at the designated time-instances, so that the combined transmitted MRT signal v(t) is as denoted by Equation (11) where the signal-insertion timing is denoted by $\tau_n$ and the pre-coding coefficient by $\gamma_{n,k}$. Equation (11) may be interpreted as inserting covariance-induced data modulating signals at designated time-instances $\tau_n$. Alternatively, the baseband modulation can be achieved using an equivalent bank of signal modulators.

$$v(t) = \sum_{n=0}^{N-1} x[n] s(t - \tau_n) = \sum_{n=0}^{N-1} \left( \sum_{k=0}^{N-1} \gamma_{n,k} a_k \right) s(t - \tau_n) \quad (11)$$

The resulting baseband MRT signal v(t) is then sent over a continuous-time (band-limited) communication channel and can be further up-modulated by Up Modulator 1145 to reach the frequency band of the physical channel. Modulation schemes, which may be employed with the disclosed embodiments of the invention, include, but are not limited to pulse amplitude modulation (PAM), QAM, binary phase-shift keying (BPSK), quadrature phase-shift keying (QPSK), continuous phase modulation (CPM), spread spectrum modulation, discrete multi-tone (DMT) modulation, and frequency-shift keying (FSK).

Figure 12:
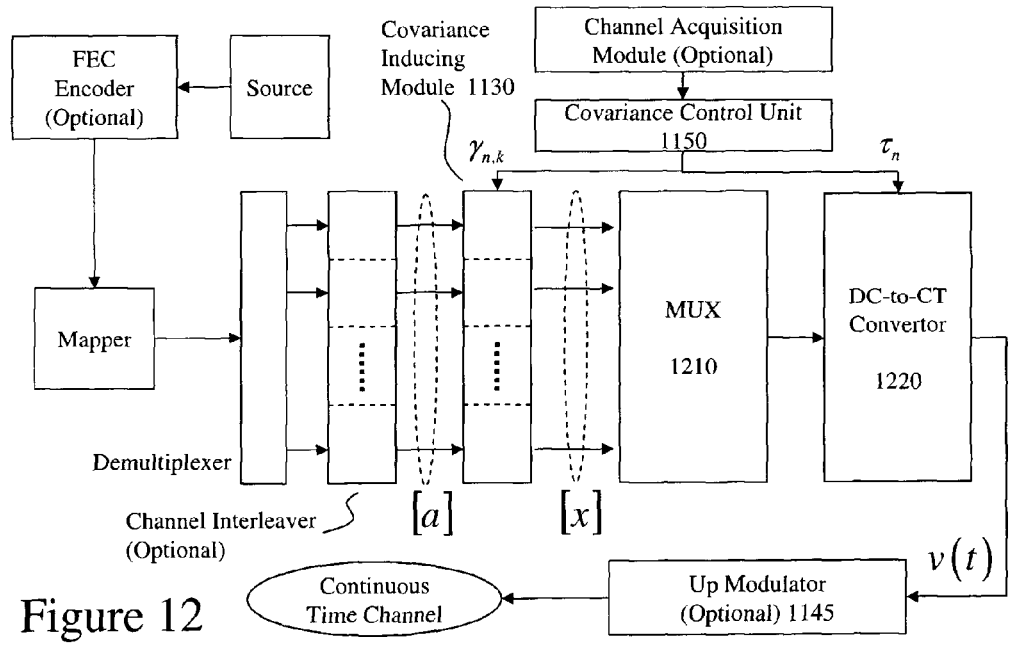
FIG. 12 depicts a block diagram of a multiplied rate transmitter architecture according to an embodiment of the invention.

Referring to FIG. 12 there is depicted an alternate exemplary MRT-Tx architecture. For simplicity only the differences to the transmitter architecture described supra in respect of FIG. 11 are discussed. After the Covariance Inducing Module 1130, the parallel streams of precoded symbols x are multiplexed into a single stream by Multiplexer (MUX) 1210. MUX 1210 is followed by a discrete-time to continuous-time (DC-to-CT) Convertor 1220 which can be a signal generator or a modulating filter with s (t) as its impulse response. The Covariance Control Unit 1150 provides timing information about time instances $\tau_n$ when signals are to be inserted as well as the weighting coefficients $y_{n,k}$. Accordingly, the DC-to-CT Convertor 1220 generates the MRT signal v(t) described by Equation (11) which may similarly be frequency up-converted by the Up Modulator 1145.

Figure 13:
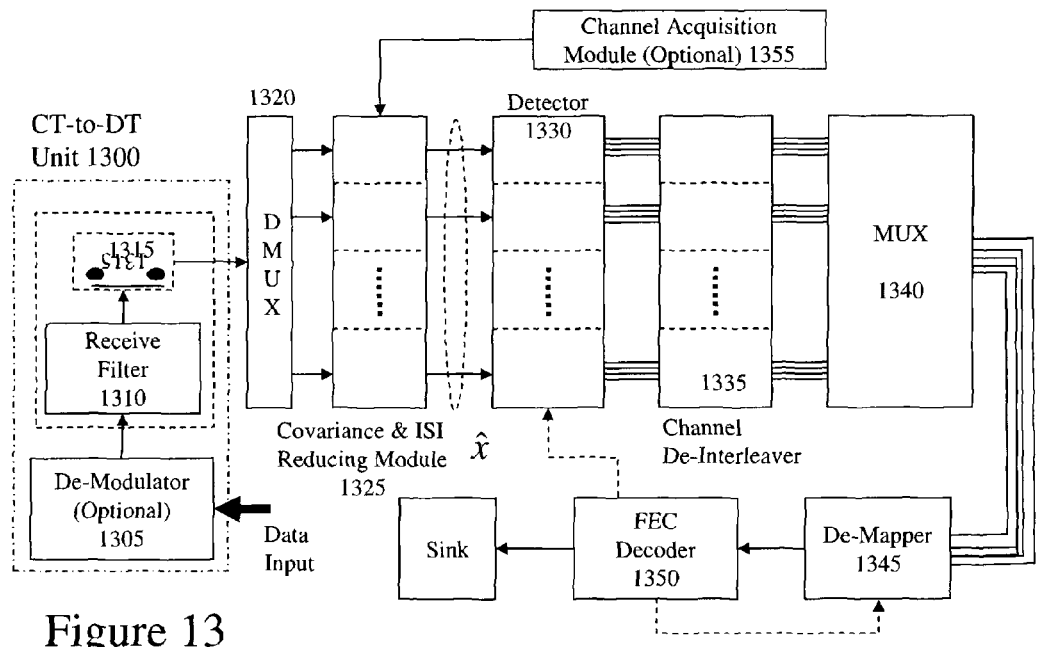
FIG. 13 depicts a block diagram of a multiplied rate receiver architecture according to an embodiment of the invention.

B2. Multiple Rate Transmission Receiver: Now referring to FIGS. 13 to 15 respectively, there are depicted exemplary Multiple Rate Transmission (MRT) Receivers (Rx) (MRT-Rx) according to embodiments of the present invention. Referring initially to FIG. 13, the received continuous-time (CT) signal from the communications channel sent by a transmitter, such as described supra in respect of FIGS. 11 and 12, is processed by a CT-to-DT Unit 1300 to generate discrete-time (DT) signal. CT-to-DT Unit 1300 comprises De-Modulator 1305, optional to down convert the signal which is processed by a matched filter comprising Receive Filter 1310 and Sampler 1315. The Receive Filter 1310 has an impulse response matched to the transmit filter response s(t). If s(t) has a temporal support of T seconds then the output of the Receive Filter 1310 is sampled at every signaling time-instances plus T, i.e. $\tau_n = \tau_n + T$ where the sample at $\tau_n$ represents an initial estimate of the transmission symbol $\hat{x}$. The matched filtering is mathematically equivalent to a projection (or an inner product) of the input signal onto the basis set $\{s(t - \tau_n)\}_n$ for n ∈ [0, N−1]. Due to their mathematical equivalence, the matched filter can also be implemented by a correlator (i.e., a multiplier with s (t) followed by an integrator over time duration of T seconds). Since the basis set is not orthogonal in general, the outputs of the matched filter are necessarily correlated, which is to be resolved later in the Covariance & ISI Reducing Unit 1325.

The output from the matched filter within the CT-to-DT Unit 1300 is coupled to DMUX 1320 which divides a stream of incoming symbols into a number of parallel sub-streams, where the number of parallel branches of the DMUX 1320 corresponds to the length of the channel data packet N, which are coupled to Covariance & ISI Reducing Unit 1325. The Covariance & ISI Reducing Unit 1325 resolves the covariance amongst the matched filter outputs that were induced by the MRT-Tx to aid transmission and ISI resulting from the non-orthogonal basis set, by performing a weighted linear combination of the inputs arriving from the DMUX 1320. The weighting coefficients are inversely proportional to the correlation of the matched filter outputs and are stored in a matrix format or another appropriate format such as within Channel Acquisition Module 1355 for example. The goal of the Covariance & ISI Reducing Unit 1325, together with the Covariance Inducing Module within the transmitter, is to jointly cancel the joint effects of the covariance and ISI induced by the MRT-Tx and the channel without information loss or bandwidth increase. The outputs of the Covariance & ISI Reducing Unit 1325, denoted by $\hat{x}$, represent improved estimates about the transmit symbols x which are then fed to Detector 1330 which may also utilize channel state information, if provided by the Channel Acquisition Module 1355. This facilitates the use of known channel equalization techniques including, but are not limited to, zero-forcing equalization (ZFE), MMSE equalization, and maximum-likelihood sequence detection (MLSE). Channel equalization compensates for the channel-induced ISI or distortions introduced by the communication channel.

Detector 1330 computes the probability of each transmission symbol $\hat{x}$ being equal to a particular modulation symbol. This is achieved using maximum likelihood or maximum a posteriori detection techniques with assumptions about the noise statistics within the channel. Accordingly, the detector outputs a set of M probability or reliability values for each input, where M denotes the number of possible modulation symbols. This set of probability or reliability values are then passed to Channel De-Interleaver 1335, MUX 1340, and De-Mapper 1345. Channel De-interleaver 1335 essentially reverses the channel interleaving process, if performed, at the transmitter. Unlike the transmitter, however, the Channel De-Interleaver 1335 may act on the streams of M probability or reliability values each rather than simply the streams of a single M-ary symbol each. The MUX 1340 subsequently combines the de-interleaved streams into a single stream in the original order which existed before the DMUX 1320 wherein De-Mapper 1345 converts each set of M probability or reliability values arriving from the MUX 1340 into a hard or soft decision about the transmitted coded symbol.

The output from De-Mapper 1345 is fed to FEC Decoder 1350, which carries out the inverse function of the FEC Encoder, if performed, within the transmitter. The FEC decoder may accept either hard or soft decision inputs and provide hard or soft decision outputs (also called reliability values). In either case, the outputs of the FEC Decoder can be redirected to the Detector 1330 and/or the De-Mapper 1345 for an iterative processing methodology. The Detector 1330 and De-Mapper 1345 may be modified such that they utilize the reliability values from the FEC Decoder 1350 for computing more accurate probability or reliability values of each transmission symbol.

Figure 14:
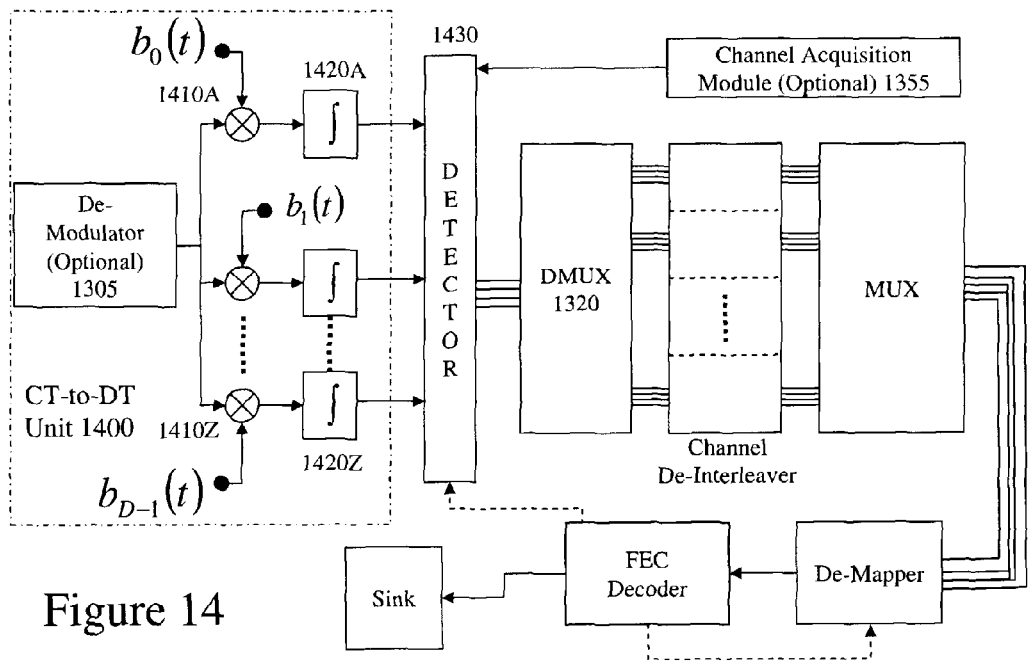
FIG. 14 depicts a block diagram of a multiplied rate receiver architecture according to an embodiment of the invention.

Now referring to FIG. 14, an alternate MRT-Rx architecture is depicted. For simplicity only the differences relative to the MRT-Rx architecture in FIG. 13 are presented. Accordingly CT-to-DT Unit 1300 is replaced with CT-to-DT Unit 1400 wherein an optional De-Modulator 1305 brings the signal into the baseband, before it is coupled to a bank of Z correlators comprising Signal Multipliers 1410A through 1410Z and Integrators 1420A through 1420Z. The correlators project the received signal onto a complete orthonormal basis that spans the entire transmit signal space determined by signal v(t). The orthonormal base functions are denoted by $\{b_k(t)\}_k$ for $k \in [1, D]$, where D is the number of dimensions where the Multipliers 1410A through 1410Z multiply by $b_k(t)$ and the Integrators 1420A through 1420Z operate over the duration of the temporal-support of $b_k(t)$. Obtaining the orthonormal basis may be obtained via a Gram-Schmidt procedure for example.

The bank of correlators comprising Signal Multipliers 1410A through 1410Z and Integrators 1420A through 1420Z provide complete statistics about the transmit symbols $\hat{x}$ due to the completeness of the basis set $\{b_k(t)\}_k$. Unlike the MRT-Rx described in respect of FIG. 13 the outputs of the correlators remain statistically uncorrelated due to the orthogonality of the basis set, hence the Covariance & ISI Reducing Unit 1325 is not needed for the MRT-Rx of FIG. 14. The outputs of the correlators represent estimates on the transmit symbols $\hat{x}$. Finally, it is noted here that the bank of correlators may be replaced by mathematically equivalent matched filters. The outputs from the Integrators 1420A through 1420Z respectively are passed to a Detector 1430 that computes the probability of each transmission symbol $\hat{x}$ being equal to a particular modulation symbol. Since the basis set $\{b_k(t)\}_k$ has a shorter time-duration than T seconds, however, the detector must wait for multiple consecutive inputs in order to collect all T seconds worth of data. This necessitates a memory bank within the detector for storing multiple (discrete) inputs. Detector 1430 is coupled to Channel Acquisition Module 1355 to receive channel state information, if provided.

Figure 15:
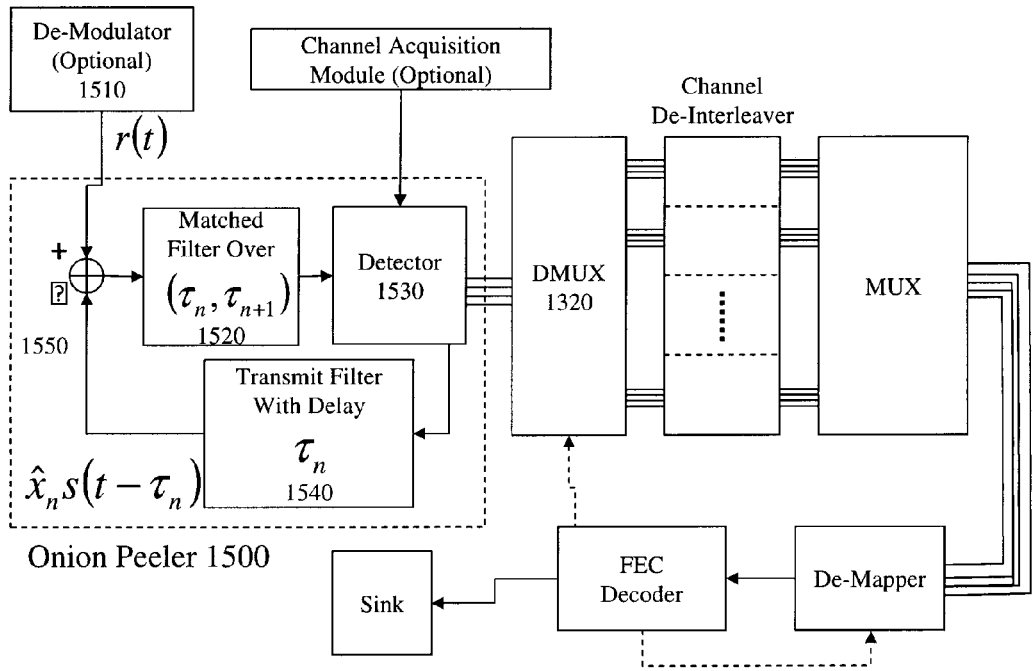
FIG. 15 depicts a block diagram of a multiplied rate receiver architecture according to an embodiment of the invention.

Now referring to FIG. 15, an alternate MRT-Rx architecture is depicted wherein for simplicity only the differences relative to the MRT-Rx architecture in FIG. 14 are presented which relate to the initial front-end processing prior to the DMUX 1320 wherein what is referred to as an "Onion Peeler" (OP) 1500 is employed wherein the received signal after a De-Modulator 1510 for down conversion is coupled to a Matched Filter 1520 via a Mixer 1550 wherein the output of the Matched Filter 1520 is coupled to Detector 1530.

It would be evident, based upon the outline above in respect of generating and transmitting/receiving the MRT signal, that during the time interval $t \in [\tau_0, \tau_1]$ only the very first transmitted signal is un-interrupted by any of the following signals. Accordingly, the OP 1500 detects only the beginning portion of the first signal over $t \in [\tau_0, \tau_1]$ and estimates its modulated transmit symbol $\hat{x}_0$. This estimate is error-control decoded (with first symbols from other channel packets), the decoder version denoted by $\hat{x}_0$, wherein it is re-modulated by s(t) to generate $\hat{x}_0 s(t-\tau_0)$ which is then subtracted from the original demodulated signal r(t) Assuming near-error free decoding of $\hat{x}_0$, this subtraction or "peeling-off" the first symbol, essentially leaves the received signal $r(t)-\hat{x}_0 s(t-\tau_0)$ free of any interference during time range $t \in [\tau_1, \tau_2]$. Therefore, during the second iteration, the second signal is detected only over the time interval $t \in [\tau_1, \tau_2]$ for estimation of $\hat{x}_1$. The estimate is subsequently error-control decoded with second symbols from other channel packets into near-error-free $\hat{x}_1$, re-modulated by $s(t-\tau)$ and subtracted off from the remaining received signal $r(t)-\hat{x}_0 s(t-\tau_0)$. Repeating this process occurs for N iterations until symbols from the packet have been recovered.

C: Multiplied Rate Transmission Broadcasting & Turbo Code Multiplied Rate Transmission Broadcast Device Architectures C1: Prior Art Broadcasting and MRT Broadcasting: Within the preceding specification and outlines according to embodiments of the invention in respect of FIGS. 2 through 15A the inventors have demonstrated that a Multiplied Rate Transmission (MRT) technique can be used to multiplex more than one stream of data for transmission over a communications channel to multiple terminals or users. In contrast in broadcasting as opposed to point-to-point communications the broadcast channel, such as in downlink cellular network or TV/radio transmission, one transmitter seeks to transmit different data to multiple receivers associated with multiple users. Prior art techniques are based upon time division multiplexing (TDM) and frequency division multiplexing (FDM) wherein different users' data is separated in either the time or frequency domain respectively. However, it is known within the prior art that broadcast channel coding may allow higher data rates to be achieved compared with traditional time-sharing broadcasting, see for example Cover in "Broadcast Channels" (IEEE Trans. Inf. Theory, Vol. IT-18, pp. 2-14). In particular, the discrete-time Gaussian broadcast channel has been studied extensively due to its practical relevance and that both superposition coding, see for example Cover and Bergmans in "A Simple Converse for Broadcast Channels with Additive White Gaussian Noise" (IEEE Trans. Inf. Theory, vol. IT-20, pp 279-290); and so-called "dirty paper" coding were shown to achieve the capacity region of this channel, see for example Costa in "Writing on Dirty Paper" (IEEE Trans. Inf. Theory, vol. 29, pp. 439-441).

Although these two coding techniques are conceptually well-understood, applying them into practical systems has been challenging and only recently has near-capacity performances been reported, see for example Sun et al in "Superposition TCM for Multirate Broadcast" (IEEE Trans. Comm., vol. 52, pp. 368-371), Berlin et al in "LDPC Codes for Fading Gaussian Broadcast Channels" (IEEE Trans. Inf. Theory, Vol. 51, pp. 2173-2182), Uppal et al in "Code Design for MIMO Broadcast Channels" (IEEE Trans. Comms., vol. 5, pp. 986-996), Ramezani et al in "Disjoint LDPC Coding for Gaussian Broadcast Channels" (Proc. IEEE Int. Symp. Inf. Theory, pp. 938-942, 2009), Amraoui et al in "Coding for the MIMO Broadcast Channel" (Proc. IEEE Int. Symp. Inf. Theory, pp. 296, 2003), and Zamir et al in "Nested Linear/Lattice Codes for Structured Multiterminal Binning" (IEEE Trans. Inf. Theory, vol. 49, pp 1250-1276).

One of the difficulties with prior art broadcast coding designs has been the requirement of joint encoding of receivers' messages, which results in either signal constellation expansion for the superposition coding or the need of lattice-coding/nonlinear-precoding/binning/etc, for the dirty paper coding. However, as discussed supra MRT allows the sending of information carrying symbols at increased rates over bandwidth limited channels and accordingly it would be beneficial to also consider the application of MRT within broadcasting. Accordingly, within embodiments of the invention described below in respect of FIGS. 17 to 26 the inventors demonstrate that MRT can achieve the spectral efficiency region of the multi-user continuous-time Gaussian broadcast channels and present architectures for transmitters, equalizers, and receivers supporting MRT broadcast and Turbo-coded MRT broadcast architectures.

C2: Review of Gaussian Broadcast Channel Spectral Efficiency Region

Figure 16:
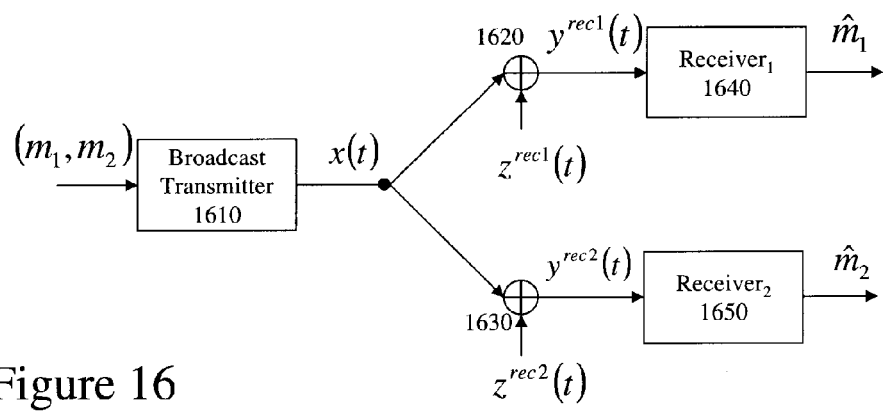
FIG. 16 depicts a schematic network block diagram for a two-user continuous time Gaussian broadcast channel supported by embodiments of the invention.

For simplicity the discussion below focuses to a continuous-time Gaussian Broadcast channel with two independent receiver-specific messages, such as shown in FIG. 16. However, it would be evident that the methodology may be extended to an arbitrary number of receivers. FIG. 16 for example models certain wireless downlink channels, e.g. two cell phones accepting two separate calls from a common base station transmitter. The Transmitter 1610 encodes the two independent messages $m_1$ and $m_2$ which are intended for the first receiver 1640, receiver$_1$, and the second receiver 1650, receiver$_2$, respectively, into a continuous-time band limited signal x(t) with a bandwidth W Hertz. The signal x(t) is then broadcast to two separate receivers, where it gets perturbed by two independent additive white Gaussian noise (AWGN) signals $z^{rec1}(t)$ and $z^{rec2}(t)$ with zero mean and two-sided power spectral densities $N_0^{rec1}/2$ and $N_0^{rec1}/2$ respectively, these being represented by signals mixed with the transmitted signals by first and second mixers 1620 and 1630 respectively. Without loss of generality, we will assume that $N_0^{rec1} \leq N_0^{rec2}$, meaning that the second receiver is affected by stronger noise than the first receiver.

The spectral efficiency region of continuous-time Gaussian broadcast channel with bandwidth W Hertz is the set of spectral efficiency pair $(\eta_1, \eta_2)$ in bits per second per Hertz as given by Equations (12A) and (12B) respectively where the available transmit power P is split into $P_1$ and $P_2$ (with $P=P_1+P_2$) to encode the first and second receivers messages respectively, see Cover and Bergmans. The spectral efficiency region defined by Equations (12A) and (12B) is derived under the assumptions of the conventional Nyquist rate transmissions at the transmitter and the standard matched filtering at the receiver. However, it has been shown by the inventors supra that exploiting Multiplied Rate Transmission can also lead to the same spectral efficiency region.

$$\eta_1 = \log_2\left(1 + \frac{P_1}{N_0^{rec1}W}\right) \quad (12A)$$

$$\eta_2 = \log_2\left(1 + \frac{P_2}{P_1 + N_0^{rec2}W}\right) \quad (12B)$$

This spectral efficiency region is achieved by transmitting Gaussian-distributed input symbols. In practice, finite symbol constellations such as PAM, QAM or PSK are used and the corresponding spectral efficiency regions with the constellation can be derived numerically, see for example Berlin and Amraoui. If we consider $X_1$ and $X_2$ as being the symbol constellations used by the first receiver 1640 and second receiver 1650 respectively then due to the power splitting the input constellations are chosen such that $X_1$ uses power $P_1$ and $X_2$ uses power $P_2$. We also define $\hat{X}_2$ as the same constellation as $X_2$ but scaled up such that the full available power $P=P_1+P_2$ is employed. Accordingly, the Gaussian broadcast spectral efficiency region with these two constellation-constraints becomes that given by Equations (13A) and (13B) where Equation (14) defines $C_X$.

$$\eta_1 \leq (TW)^{-1} C_{X1}(N_0^{rec1}/2) \quad (13A)$$

$$\eta_2 \leq (TW)^{-1}(C_{\hat{X}2}(N_0^{rec2}/2) - C_{X2}(N_0^{rec2}/2)) \quad (13B)$$

$$C_X(\sigma^2) = \quad (14)$$

$$\log_2|X| - \frac{1}{|X|}\sum_{x \in X} E_{r|x}\left\{\log_2 \sum_{x' \in X} \exp\left(\frac{(y-x)^2 - (y-x')^2}{2\sigma^2}\right)\right\}$$

Figure 17A:
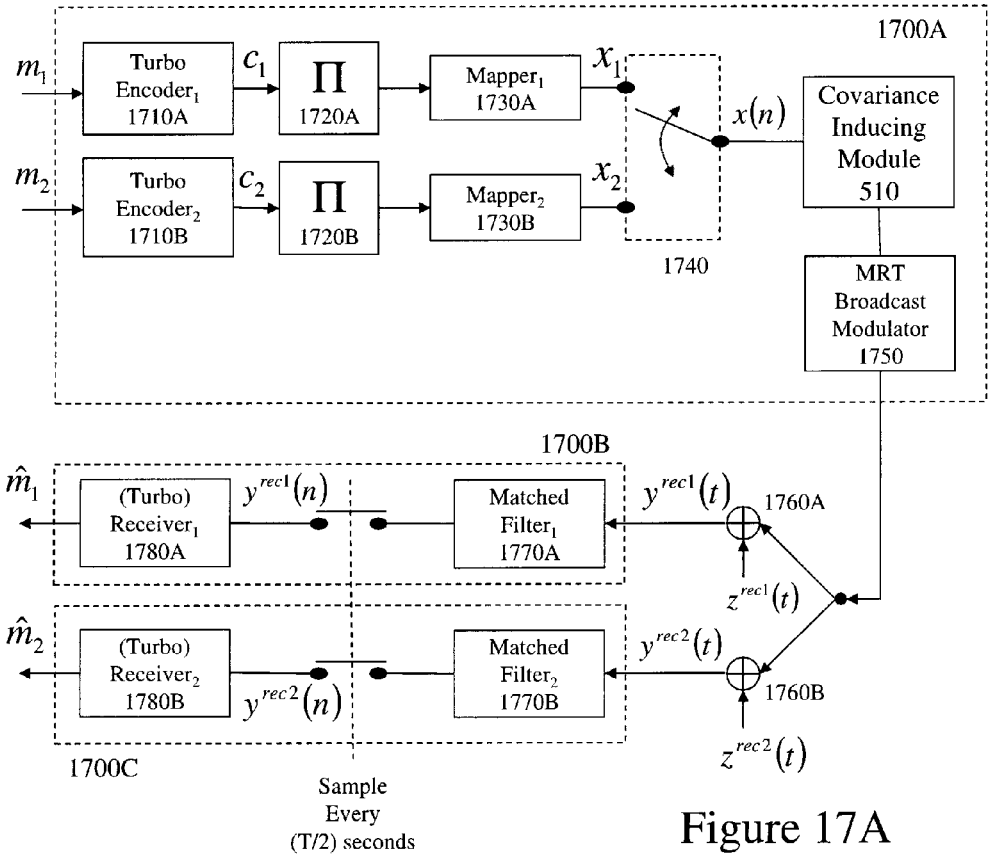
FIG. 17A depicts a system block diagram according to an embodiment of the invention for multiplied rate transmission over a two-user continuous time Gaussian broadcast channel.

C3: MRT Broadcast System: the MRT signaling approach over a two-user continuous-time Gaussian broadcast channel is illustrated in FIG. 17A. At the MRT transmitter (Tx) 1700A, the two messages $m_1$ and $m_2$ are separately encoded by receiver-specific error correction encoders, first and second Turbo Encoders 1710A and 1710B respectively, interleaved by first and second interleavers 1720A and 1720B respectively, and mapped onto separate receiver specific signal constellations (e.g. antipodal and 8-ary PAM) by the first and second Mappers 1730A and 1730B respectively. The resulting data symbols $x_1$ and $x_2$ are then passed Covariance Inducing Module 510 prior to being coupled to the MRT Broadcast Modulator 1750. The Covariance Inducing Module 510 receiving data from the first and second Mappers 1730A and 1730B respectively alternately through the switching function of Switch 1740 and inducing the desired covariance onto the modulation symbols to be transmitted. MRT Broadcast Modulator 1750 generates therefore an output defined by Equation (15), depicted schematically within FIG. 17B, where $x_k[n]$ denotes the n-th data symbol of receiver k's message (k ∈ {1,2} within this example), N is each receiver's packet length, 1/T is the channel Nyquist rate, and s(t) is a T-orthogonal unit energy modulating pulse.

$$x(t) = \sum_{n=0}^{N-1} x_1 s(t-nT) + \sum_{n=0}^{N-1} x_2[n]s(t-nT-(T/2)) \quad (15)$$

$$x(t) = \sum_{n=0}^{2N-1} x[n]s(t-(nT/2)) \quad (16)$$

$$x[n] = \begin{cases} x_1[n/2] & \text{if } n \geq 0 \text{ even} \\ x_2[(n-1)/2] & \text{if } n \geq 0 \text{ odd} \end{cases} \quad (17)$$

Figure 17B:
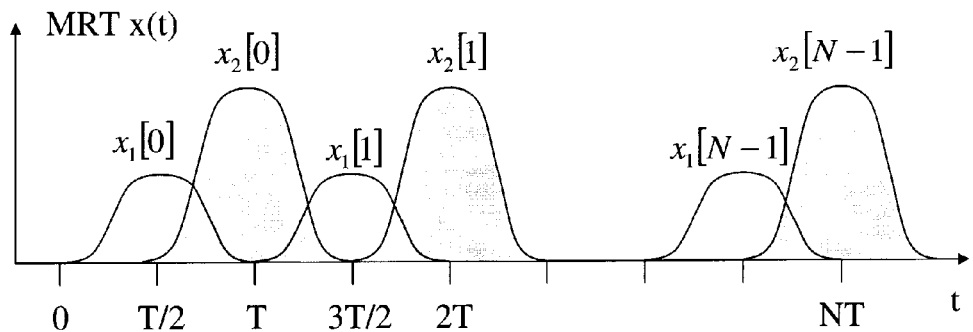
FIG. 17B depicts schematically a multiplied rate broadcast signal carrying two signals for a two-user continuous time Gaussian broadcast channel according to an embodiment of the invention.

For convenience Equation (15) is re-written as Equation (16) where x[n] (without subscripts) represents the combined stream of receivers' data symbols in the order they were transmitted as given by Equation (17) respectively and as can be also seen in FIG. 17B. In contrast to prior art broadcast channel coding where two messages must be jointly encoded to produce one data symbol at each symbol interval, MRT can transmit the two receiver data symbols $x_1[n]$ and $x_2[n]$ explicitly over the channel by doubling the number of channel uses. Furthermore, the considered MRT broadcasting does not require any bandwidth expansion due to the delay property of the Fourier transform and independence of the data symbols x[n].

At the two receivers 1700B and 1700C respectively noisy signals $y^{rec1}[t]$ and $y^{rec2}[t]$ are received from their respective channels which have added AWGN signals $z^{rec1}[t]$ and $z^{rec2}[t]$, depicted figuratively as being added by first and second summing elements 1760A and 1760B respectively to the transmitted signal. These are passed to respective first and second matched filters 1770A and 1770B respectively with the impulse response s(−t) and then sampled every T/2 seconds (i.e. at the MRT signaling rate) before being coupled to the first and second (Turbo) Receivers 1780A and 1780B respectively. The n-th sample at the k-th receiver, $y^{reck}[n]$, is given by Equation (18), with an understanding that x[n]=0 for n<0 and n≥2N where the integer parameter L determines the memory length of the MRT-induced ISI and can be appropriately chosen depending on the support of the pulse correlations h, as given by Equation (19).

$$y^{reck}[n] = \sum_{l=-L}^{L} h_l x[n-l] + z^{reck}[n] \quad (18)$$

for $n = 0, 1, \ldots, 2N-1$ $$h_l = \int_{-\infty}^{+\infty} s(t)s(t-l \cdot T/2) dt \quad (19)$$

$$E\{z^{reck}[n]z^{reck}[m]\} = (N_0^{reck}/2) \cdot h_{(m-n)} \quad (20)$$

The noise sample after the k-th receiver matched filter $$z^{reck}[n] = \int_{-\infty}^{+\infty} z^{reck}(t)s(t-nT/2)dt$$

is Gaussian distributed with a mean zero and an autocorrelation as given by Equation (20). It would be evident to one skilled in the art that optionally MRT-Tx 1700A may be implemented in a modular manner with sub-modules comprising encoding, interleaving, and mapping elements which are coupled to Switch 1740. Alternatively, sub-modules addressing a number of channels may be employed in conjunction with a switch that couples to part of a large switching fabric to combine all the sub-modules. In this manner, a Multi-User MRT-Tx may be implemented from a plurality of sub-modules in a scalable format.

C4: MRT Broadcast Turbo Receiver: Within the preceding section an MRT broadcast architecture was presented that allows the spectral efficiency region of a continuous-time Gaussian channel to be achieved for multi-users with broadcast channels. Such architectures exploit MRT transmitters, equalizers, and receivers to support MRT broadcast and Turbo-coded MRT broadcast architectures. It would be beneficial for the MRT receivers to be designs of low complexity whilst supporting a methodology based upon Turbo decoding and successive ISI cancellation. Receiver architectures according to embodiments of the invention conform to Cover's coding principle for degraded broadcast channels and hence the receiver affected by stronger noise, i.e. second receiver 1700B in FIG. 17, may perform only single user decoding of $m_2$, whilst the first receiver 1700C which is affected by weaker noise needs to perform joint decoding of both messages in order to strive achieving the full spectral efficiency benefits of the Gaussian broadcast channel.

Accordingly, with extension of the MRT broadcast architecture to N users it would be evident that the receivers may, depending upon knowledge of their effective noise level relative to the received signal, decode N−M messages of the N transmitted. Such knowledge may be established from a network discovery step, such as when a wireless device associates with a wireless base station/access point for example, or dynamically during a session based upon a received signal strength indicator (RSSI) for example. Alternatively, each receiver may decode all N messages and discard those not intended for it. Optionally, receivers decoding all N or N−M messages may therefore receive multiple messages from the transmitted set of messages. It would be evident therefore that user accessing a network supporting an MRT broadcast architecture as discussed supra may be dynamically allocated multiple messages, where such messages are not currently allocated to other users, according to their dynamic network requirements.

Figure 18:
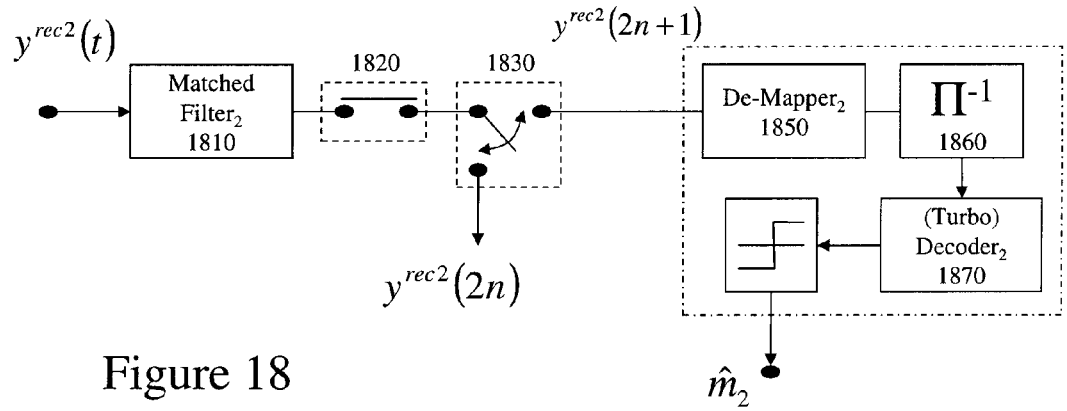
FIG. 18 depicts a multiplied rate transmission receiver according to an embodiment of the invention for single user decoding.
Figure 19:
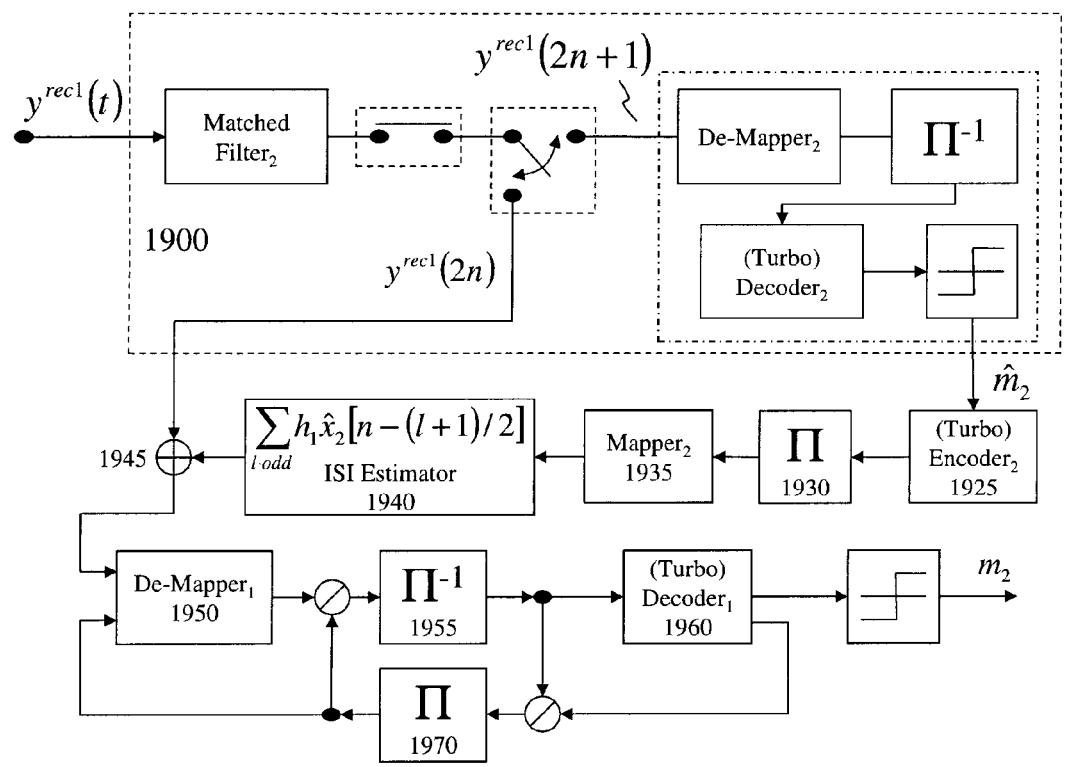
FIG. 19 depicts a multiplied rate transmission receiver according to an embodiment of the invention employing successive cancellation.

Referring to FIGS. 18 and 19 there are depicted schematic block diagrams of first and second receivers wherein the first receiver represents a receiver such as second receiver 1700C in FIG. 17 described supra decoding a single decoding, whilst second receiver represents a receiver such as first receiver 1700B described supra performing multiple user decoding and successive cancellation.

C5: Single User Decoding MRT Receiver Architecture: The single user MRT (SU-MRT) receiver (Rx) depicted in FIG. 18 operates by taking the Matched Filter 1810 output symbols, sampling these at T/2 with Sampler 1820 and splitting these into $y^{rec2}(2n)$ and $y^{rec2}(2n+1)$ symbol substreams with Splitter 1830. Then $y^{rec2}(2n)$ data can be interpreted as observations for first receiver's data symbols $x_1[n]$, whereas $y^{rec2}(2n+1)$ corresponds to observations for the second receiver's data symbols $x_2[n]$. For convenience, we define $y_2^{rec2}[n]=y^{rec2}[2n+]$ for n–0,1, . . . , N−1 and re-write Equation (18) as Equation (21).

$$y_2^{reck}[n] = \sum_{l \text{ even}}^{L} h_l x[2n+1-l] + \sum_{l \text{ odd}}^{L} h_l x[2n+1-l] + z^{rec2}[2n+1] \quad (21)$$

$$y_2^{rec2}[n] = \sum_{l \text{ even}}^{L} h_l x_2[n-l/2] + \sum_{l \text{ odd}}^{L} h_l x_1[n-(l-1)] + z^{rec2}[2n+1] \quad (22)$$

However, by the definition of x[n] in Equation (17) then Equation (21) itself can be further re-written as a function of $x_1[n]$, this can then be rewritten as a function of $x_1[n]$ and $x_2[n]$ as presented in Equation (22). For T-orthogonal unit energy modulating pulses s(t) and for even, the pulse correlations $h_1$ as defined in Equation (19) are all zeros except $h_0=1$ at $l=0$. Due to the same reason, the noise samples $z^{rec2}[2n+1]$ are uncorrelated zero mean Gaussian distributed with $N_0^{rec2}/2$ variances. As a result Equation (22) can be simplified to Equation (23).

$$y_2^{rec2}[n] = x_2[n] + \sum_{l odd}^{L} h_l x_1[n-(l-1)/2] + z^{rec2}[2n+1] \quad (23)$$

The term $$\sum_{l odd}^{L} h_l x_1[n-(l-1)/2]$$

appearing in Equation (23) represents ISI due to the desired symbol $x_2[n]$, and due to the central limit theorem, it converges to a Gaussian random variable as the ISI memory length L tends to infinity. Accordingly supported by this observation, wer treat the ISI term $$\sum_{l odd}^{L} h_l x_1[n-(l-1)/2]$$

as noise and approximate it by a Gaussian random variable with zero mean and $$P_1 T \sum_{l odd} |h_l|^2$$

variance, due to the variance of $x_1[n]$ being $P_1$ T. Therefore, the a posteriori probabilities for the second receiver's data symbols $x_2[n]$ can be approximated by Equation (24) where the variance $$\sigma^2 = N_0^{rec2}/2 + P_1 T \sum_{l odd} |h_l|^2,$$

$Pr(x_2[n])$ is a priori probability $x_2[n]$, and C is a normalization constant. Using the approximation in Equation (24), the De-mapper 1850 in FIG. 18 computes a-posteriori probabilities of $x_2[n]$ and the corresponding codewords $c_2[n]$ and then feeds the de-interleaved a-posteriori probabilities of $c_2[n]$, generated via De-Interleaver 1860, to the Turbo Decoder$_2$ 1870. The Turbo Decoder 1870 then iteratively improves the reliability values about the codewords $c_2[n]$ and the second messages $m_2[n]$. After a prescribed number of Turbo iterations the hard decisions $\hat{m}_2[n]$ are taken.

$$Pr(x_2[n] | y_2^{rec2}[n]) \cong C \cdot Pr(x_2[n]) \exp\left(-\frac{(y_2^{rec2}[n] - x_2[n])^2}{2\sigma^2}\right) \quad (24)$$

C6: Multi-User Decoding MRT Receiver Architecture: The multi-user MRT (MU-MRT) receiver (Rx) depicted in FIG. 19 operates by initially decoding the second messages using the Rx Front-End 1900 which replicates the SU-MRT Rx architecture depicted in FIG. 18 and described supra. The decoded messages $m_2[n]$ from the Rx Front-End 1900 are then used to estimate the second receivers data symbol $\hat{x}_2[n]$ by re-encoding with (Turbo) Encoder$_2$ 1925, re-interleaving with First Interleaver 1930, and re-mapping $\hat{m}_2[n]$ with Mapper 1935. By following similar steps as outlined in Equations (21) through (23) the inventors can show that, with a definition of $y_1^{rec1}[n] = y^{rec1}[2n]$ for n=0, 1, ..., N−1, then $y_1^{rec1}[n]$ can be determined from Equation (25) where $z^{rec1}[2n]$ are uncorrelated Gaussian noise samples with zero mean and $N_0^{rec1}/2$ variances. The ISI term $$\sum_{l odd}^{L} h_l x_2[n-(l-1)/2]$$

from Equation (25) is then estimated in ISI Estimator 1940 by replacing $x_2[n]$ by its estimate $\hat{x}_2[n]$, and the estimated ISI $$\sum_{l odd}^{L} h_l x_2[n-(l-1)/2]$$

is then subtracted from $y_1^{rec1}[n]$, in Summation Block 1945, as evident from Equation (25) to obtain near ISI-free observation on $x_1[n]$. The a posteriori probabilities are then given by Equation (26) where C is a normalization constant and $Pr(x_1[n])$ is a priori probability of $x_1[n]$.

$$y_1^{rec1}[n] = x_1[n] + \sum_{l odd} h_l x_2[n-(l-1)/2] + z^{rec1}[2n+1] \quad (25)$$

$$Pr(x_2[n] | y_1^{rec1}[n]) \cong C \cdot Pr(x_1[n]) \exp\left(-\frac{(y_1^{rec1}[n] - x_1[n])^2}{N_0^{rec1}}\right) \quad (26)$$

Using Equation (26), the De-Mapper 1950 in FIG. 19 computes a-posteriori probabilities of $x_1[n]$ and the corresponding codewords $c_1[n]$. These codewords are then de-interleaved, using De-Interleaver 1955, and fed to the (Turbo) Decoder 1960, which provides improved reliability values about the codewords $c_1[n]$ and the message bits $m_1[n]$. The reliability values about the codewords $c_1[n]$ are also fed back to the De-Mapper 1950 as extrinsic information about $c_1[n]$ and the corresponding $x_1[n]$ for subsequent iterative decoding steps via Second Interleaver 1970.

It would be evident to one skilled in the art that the embodiments of the invention described supra in respect of FIGS. 16 through 19 are specific architectures described for the purposes of teaching Multiplied Rate Transmission within a broadcasting concept. It would be evident that the techniques may be applied to broadcasting in contexts other than two users. Such contexts may include, but are not limited to, broadcasting to multiple users, broadcasting with non-AWGN channels, broadcast architectures without covariance inducing modules to address channel degradations, broadcast architectures with covariance inducing modules with or without channel degradations, broadcast architectures with error-control coding, and iterative processing.

Such architectures may support K>>2 as well as operating on non-AWGN channels arising as a result of factors including, but not limited to, noise, channel fading, intersymbol interference, dispersion, and bandwidth upon channels that may be wireless, RF, microwave, optical, and electrical in respect of the physical transmission channel.

D: MRT Broadcast Architecture Simulation Results

Figure 20:
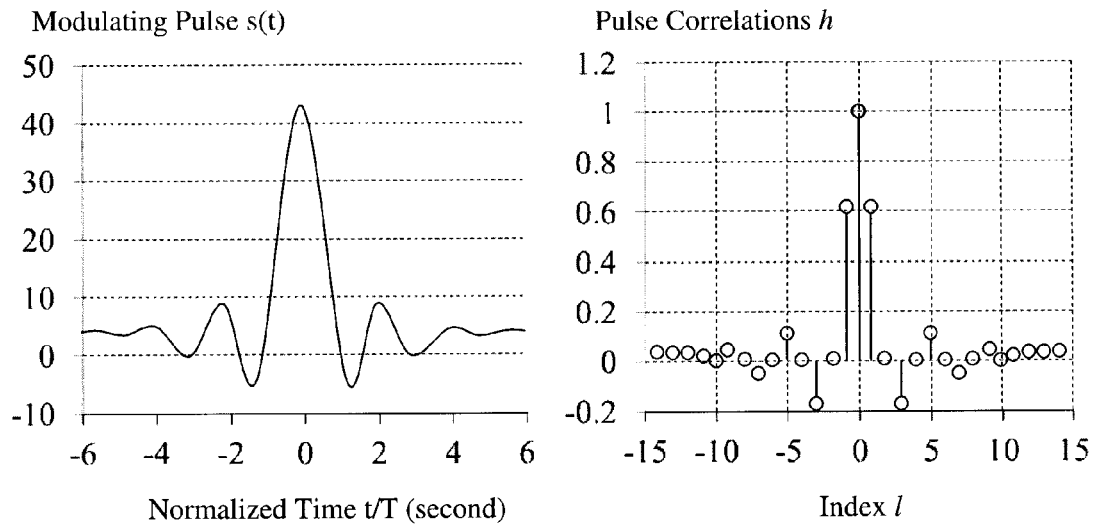
FIG. 20 depicts characteristics of a time-truncated square-root raised cosine modulating pulse for a multiplied rate transmission architecture according to an embodiment of the invention.

Simulated performances of the designed MRT broadcast architecture from FIG. 16 together with SU-MRT Rx and MU-MRT Rx receivers depicted in respect of FIGS. 18 and 19 were obtained using a square-root raised cosine modulating pulse s(t) with the roll-off factor β=0.22 as adopted within the Wideband-Code Division Multiple Access standard. The modulating pulse has a time-truncation to ±6 T about t=0, signaling interval T=(1+β)/2 W, and W=1 kHz. In FIG. 20 the modulating pulse in time domain and the corresponding pulse correlation coefficients $h_1$ as defined in Equation (19) are presented in first and second images 2000A and 2000B respectively.

The two encoders, for example first and second Turbo Encoders 1710A and 1710B respectively in FIG. 17, were chosen to be rate ⅓ Universal Mobile Telecommunications System (UMTS) parallel Turbo codes, see for example Valenti et al in "The UMTS Turbo Code and an Efficient Decoder Implementation Suitable for Software-Defined Radio" (Int. J. Wireless Inf. Networks, Vol. 8, pp. 203-215) and the available power P was split between the two messages as $P_1$=0.019P and $P_2$=0.981P. All interleavers were pseudorandom with the packet length of $N=10^5$. Both receiver messages were mapped using binary antipodal signaling. Based upon these design choices, the spectral efficiencies of the first and second receiver messages are equal and are given by $\eta_1=\eta_2$=(⅓)/T/W=0.5464 in bits per second per Hertz.

Figure 21:
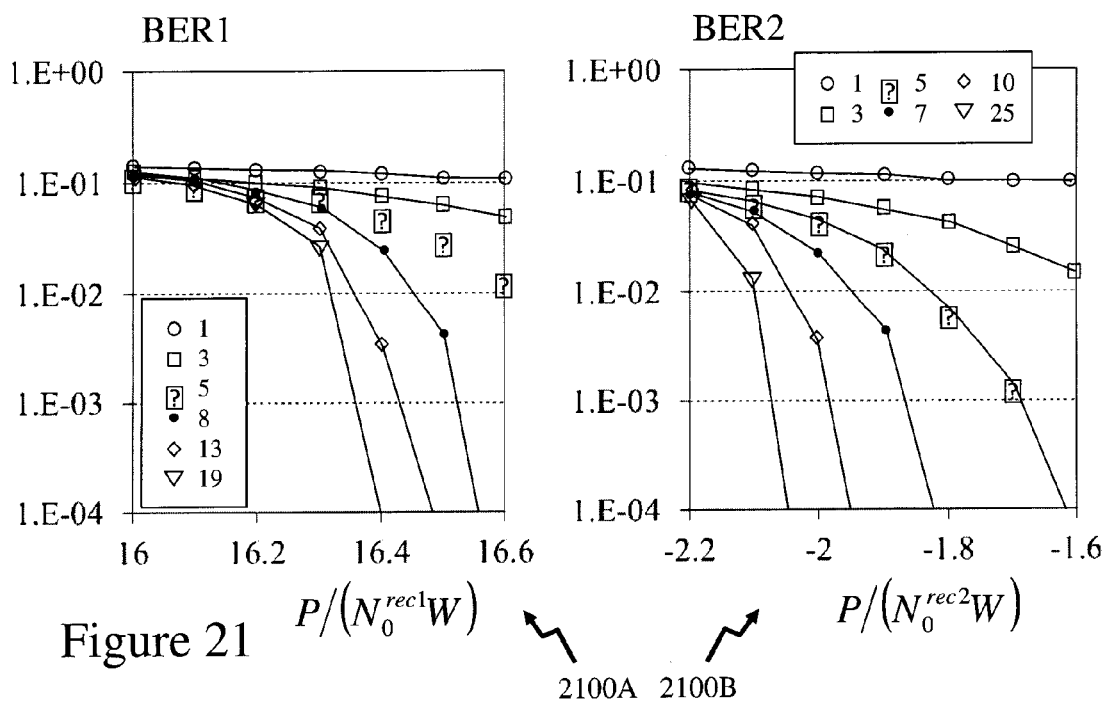
FIG. 21 depicts simulated BER performance as a function of SNR for multiplied rate receivers according to embodiments of the invention exploiting single user and successive cancellation decoding methodologies using binary antipodal signaling.

The simulated BER curves of the proposed MRT broadcast receivers, first and second receivers 1700B and 1700C respectively as depicted in FIGS. 18 and 19 respectively according to embodiments of the invention, are shown in FIG. 21 in first and second graphs 2100A and 2100B respectively. From this the bit-error rates (BERs) reach the target performance of $BER=10^{-4}$ at approximately $P/(N_0^{rec1} W)$=16.4 dB and $P/(N_0^{rec2} W)$=−2.05 dB, after 19 and 25 Turbo-iterations, respectively. Subsequently, the MRT broadcast architecture was simulated with a higher order modulation, e.g. the first message is mapped to an 8-PAM constellation with "d21" mapping, see for example Brink in "Designing Iterative Decoding Schemes with the Extrinsic Information Transfer Chart" (AEU Int. J. Electron. Commun., Vol. 54, pp. 389-398) whilst the second message was still mapped to the binary antipodal constellation. The power allocation was adjusted to $P_1$=0.05P and $P_2$=0.95P. $Encoder_1$ at the transmitter is a rate ½ recursive systematic convolutional code with memory, described by $(G_r,G)$=(07,05), while $encoder_2$ uses the raw ⅓ UMTS parallel Turbo code and the packet length is $N=3\times10^4$. The spectral efficiencies of the first and second receivers are now given by $\eta_1=\log_2(8)\cdot$(½)/T/W=2.459 and $\beta_2$=(⅓)/T/W=0.5464 in bits per second per Hertz. The results of these network simulations are presented in FIG. 22 as first and second simulated BER curves 2200A and 2200B respectively for the two MRT broadcast receivers. The BER curves of the first and second receivers reach the target performance at $P/(N_0^{rec1} W)$=22.75 dB and $P/(N_0^{rec2} W)$=−1.65 dB, after 28 and 16 Turbo iterations, respectively.

Figure 22:
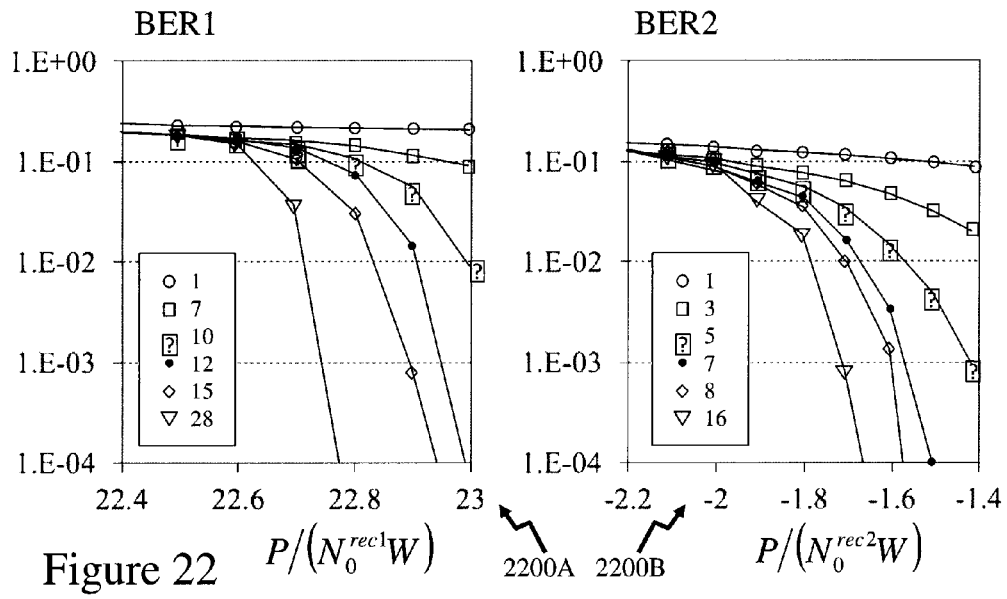
FIG. 22 depicts simulated BER performance as a function of SNR for multiplied rate receivers according to embodiments of the invention exploiting single user and successive cancellation decoding methodologies with *-PAM and antipodal signaling.
Figure 23:
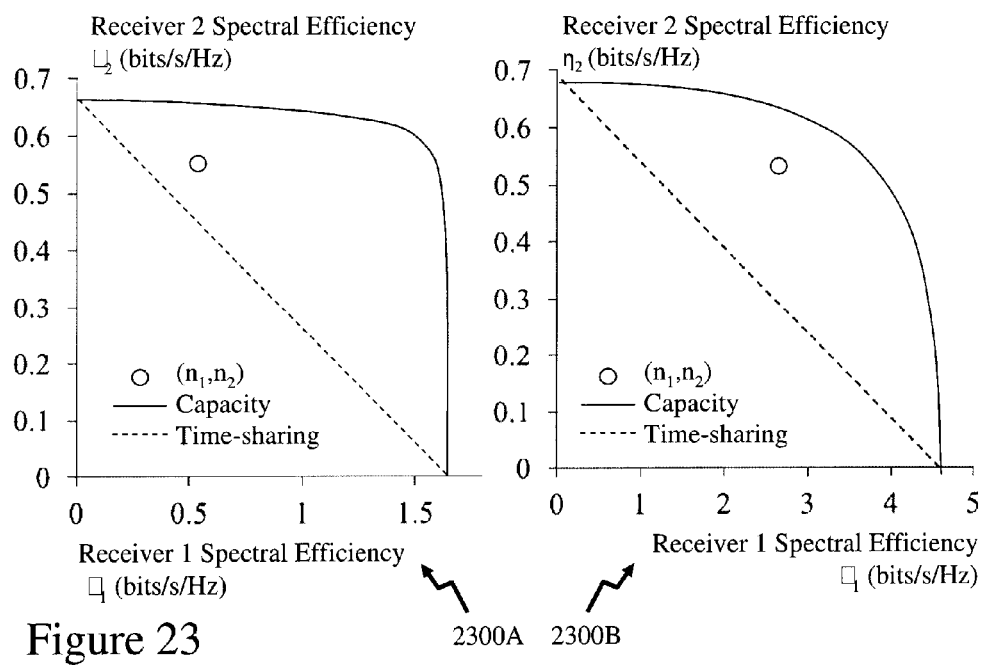
FIG. 23 depicts achieved spectral efficiencies for multiplied rate receivers according to embodiments of the invention.

Now referring to FIG. 23, the achieved spectral efficiency pair $(\eta_1, \eta_2)$ of the proposed MRT broadcast system according to embodiments of the invention are compared with the spectral efficiency region of the Gaussian broadcast channel according to the prior art. In first graph 2300A the achieved spectral efficiency pair of the first simulated system according to an embodiment of the invention, simulation results depicted in FIG. 21, is depicted showing performance that is clearly above the spectral efficiency boundary of the time-sharing broadcasting according to the prior art, shown by a dotted diagonal line, demonstrating the enhanced performance of the designed MRT broadcast system. In second graph 2300B, the achieved spectral efficiency pair $(\eta_1, \eta_2)$ of the second simulated MRT broadcast system according to an embodiment of the invention, simulation results depicted in FIG. 22, is depicted with respect to the broadcast channel spectral efficiency region defined by Equations (13A) and (13B) with the 8-PAM constellation constraint for the first receiver and binary-alphabet constraint for the second receiver. It can be seen that a similar observation is attained wherein the simulated MRT broadcast system according to an embodiment of the invention clearly outperforms the prior art time-sharing broadcasting. Further, these results also indicate a potential methodology of approaching the spectral efficiency boundary of the Gaussian broadcast channel using MRT transmitters and SU-MRT Rx and MU-MRT Rx receivers described supra in respect of embodiments of the invention.

E: MRT Equalizer Based Receiver Architecture

At the j th MRT broadcast receiver depicted in FIG. 24A, the matched filter output vector y(i) is first passed to a MRT maximum a-posteriori (MAP) Equalizer 2410, along with a-priori log-likelihood ratio (LLR) values about the data-symbols x (denoted by $L_a$(9, which are initially set to zero). The MRT MAP Equalizer 2410 evaluates soft outputs (or reliability values) about the data symbols x given y(i) and is described in detail below. From the soft outputs of the MRT MAP Equalizer 2410, the contribution from a-priori LLR values of $L_a(x)$ are subtracted to obtain an extrinsic LLR of $L_e(x)$ about the data-symbols in x. Subsequently, $L_e(x)$ are de-multiplexed by DMUX 2420 into K-user data-symbol formats, $L_e(x_i), L_e(x_2), \ldots, L_e(x_k)$, by following the definition of x. The i th Branch 2430 uses the degraded structure of the Gaussian broadcast channel and processes only $L_e(x_i)$, $L_e(x_{i+1}), \ldots, L_e(x_K)$, since the remaining data vectors $x_1$, $x_2, \ldots, x_{i-1}$ cannot be properly decoded at this receiver. The extrinsic LLRs $L_e(x_i), L_e(x_{i+1}), \ldots, L_e(x_K)$ are then de-mapped into a binary bit format, which are further de-interleaved and error-control decoded. The decoder provides reliability values about the codeword bits in $c_1$ and the corresponding message bits in $m_j$ for $j \in \{i, K\}$.

In the second and subsequent iterations of the turbo equalization, the extrinsic LLRs $L_e(c_1), L_e(c_{i+1}), \ldots, L_e(c_K)$ are re-interleaved, re-mapped, and multiplexed back together by MUX 2440 to form updated a priori LLR values of $L_a(x)$ about the data-symbols in x. These LLR values are then fed back to the MRT MAP Equalizer 2410 for improved estimates about the data symbols in x. The MUX 2440 is also coupled to a summation block between the MRT MAP Equalizer 2410 and DMUX 2420. The iterative MRT broadcast receiver performs iterations for a prescribed number of times.

As MRT signaling introduces ISI, a soft-decision MRT MAP Equalizer 2410 is shown as disposed within the iterative MRT broadcast receiver according to an embodiment of the invention to compensate for this. At the i th Branch 2430, the n th sample of the matched filter output vector $y^{(i)}$ can be written as Equation (27) where L determines the memory length of the MRT-induced ISI and the correlated Gaussian noise samples $$z^{(i)}[n] = \int_{-\infty}^{\infty} z^{(i)}(t)s(t - nT/K)dt$$

have zero mean and autocorrelation $E\{z^{(i)}[n]z^{(i)}[m]\}=(N_0^{(i)}/2)h_{m-n}$, m, n ∈ Z. Note that L can be appropriately chosen depending on $$h_l = \int_{-\infty}^{\infty} s(t)s(t - l \times T/K)dt, l \in Z.$$

the support of pulse correlation coefficients $$y^{(i)}[n] = \sum_{i=-L}^{L} h_l x[n-l] + z^{(i)}[n] n \in \{0, KN - 1\} \quad (27)$$

For the MRT MAP Equalizer 2410, an appropriate trellis diagram was constructed from the block diagram in FIG. 24B wherein it is evident that a K-tuple input [x[n], x[n+1], ..., x[n+k−1]] is admitted and the corresponding trellis states are all possible combinations of L consecutive binary data symbols in x[n]. The appropriate trellis branch metrics were obtained using Colavolpe et al in "On MAP Symbol Detection for ISI Channels using Ungerboeck Observation Model" (IEEE Comm. Lett., vol. 9, pp. 720-722) upon the basis that the MRT channel model is an instance of the Ungerboeck observation model. Hence, the trellis-edge branch metric between state s at the m th trellis-stage and state s' at the (m+1) th trellis-stage (m E [0, N−1] is given by Equation (28). Using the trellis structure and the above branch metric, the MRT MAP Equalizer 2410 was implemented using the BCJR algorithm.

$$\gamma_m(s, s') = \prod_{j=Km}^{Km+(K-1)} p(x[j])\exp\left(\frac{x[j]}{N_0/2}\left(y^{(i)}[j] - \frac{1}{2}x[j]h_0 - \sum_{l=1}^{L} x[j-l]h_l\right)\right) \quad (28)$$

FIG. 25 depicts the simulated performance of the proposed MRT broadcast architecture from FIGS. 17A and 24 for a two-user Gaussian broadcast channel. The modulating pulse s(t) was adopted from the WCDMA standard as the square-root raised cosine with the roll-off factor β=0.22, while time-truncation was ±6 T, signaling interval T=(1+β)/(2 W) and W=1 kHz. We observed that for the considered square-root raised cosine pulse and |t|>5, the corresponding pulse correlations $h_1$ were small in size (less than 0.05), hence the ISI memory length L was approximated to be 5. (It was also verified by simulations that fixing L=5 indeed had only negligible performance impact.) The two encoders at the MRT broadcast transmitter were either Berrou's rate ½ parallel turbo codes or the rate ⅓ UMTS parallel Turbo codes. The turbo equalizer used 30 iterations with packet length N=2×10⁴ and both users were using binary antipodal modulation. The available power P was split between the two user messages as $P_1$=0.2P and $P_2$==0.8P.

Bit error rate (BER) curves of the simulated MRT broadcast systems in FIG. 25 reached the target BER=10⁻⁴ within 1 dB from the corresponding capacities of the binary-input Gaussian broadcast channel. FIG. 25 also shows the corresponding achieved spectral-efficiencies with respect to the spectral efficiency region of the binary-input Gaussian broadcast channel at the converging SNRs. The results demonstrate that the proposed MRT broadcast system can perform near the spectral efficiency boundary of the Gaussian broadcast channel and comparison to the dashed lines in FIG. 25 illustrates that it clearly outperforms time-sharing-based broadcasting. (Different power ratios were also successfully tested, yielding similar near-capacity BER performance and improved spectral efficiency.)

It would be evident to skilled in the art that the receiver architecture presented supra in respect of FIGS. 24A and 24B may be applied to broadcasting in contexts other than two or a small number of users. Such contexts may include, but are not limited to, broadcasting to multiple users, broadcasting with non-AWGN channels, broadcast architectures with covariance inducing modules to address channel degradations, broadcast architectures with covariance inducing modules with or without channel degradations, broadcast architectures with error-control coding, and iterative processing. Such architectures may support K>>2 as well as operating on non-AWGN channels arising as a result of factors including, but not limited to, noise, channel fading, intersymbol interference, dispersion, and bandwidth upon channels that may be wireless, RF, microwave, optical, and electrical in respect of the physical transmission channel.

Implementations of the MRT architecture, transmitters, receivers, and equalizers described supra in respect of FIGS. 2 through 25 may be employed for a variety of communications channels. Examples include, but are not limited to, wireless transmission channels (e.g. point to point, broadcast wireless, multi-access, multi-antenna (MIMO), relay, etc.) and wired transmission channels (e.g. over coaxial cables, twisted pairs, optical fiber, etc.) both for distant communication (e.g., from a telephone central office or cable television head end or distribution unit to a consumer's home) as well as for local communication (e.g., for computer to peripheral interconnections). Such communication channels may be band limited due to frequency allocation, while other channels may have bandwidth constraints that are a function of physical constraints of the medium. In some examples, the approaches described above are used for device interconnections, for example, on busses (e.g., on a single computer board or on a backplane) or peripheral cables in a computer system. For example, a computer peripheral communication approach may use a conventional signaling approach that is augmented with multiplied rate signaling when channel characteristics (e.g., noise, bandwidth) permit the added data rate.

Within the embodiments of the invention described supra the signaling pulses have been presented as being uniformly spaced in time. However, alternative embodiments of the invention may be implemented wherein the signaling pulses are not necessarily uniformly spaced in time. For instance an "asynchronous" architecture may be based on sending the modulation pulses s(t) "asynchronously" at time instances $0 \leq \tau_0 < \tau_1 < ... < \tau_{N-1}$. Accordingly the channel waveform is given by Equation (31) so that the average rate of sending the information carrying symbols x[n] is $N/\tau_{N-1}$.

$$v(t) = \sum_{n=0}^{N-1} x[n]s(t - \tau_n) \quad (31)$$

In other embodiments of the invention, the approaches may be employed to implement a digital upgrade of an analog communication system into a hybrid analog/digital communication system. Such an upgrade consists of adding an MRT digital system that "squeezes" itself within a very small sub-band of the analog system's spectrum to achieve its transmission. Its signal-to-interference-and-noise ratio SINR for the MRT system is large due to the digital power concentration within a very small bandwidth. The analog receiver would require upgrading to provide a band-suppress filter to avoid the narrow band interference from the MRT system. This would cause a negligible analog performance loss due to very narrow bandwidth of the digital MRT channel.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the Figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. The memory may include machine-readable code segments (e.g. software or software code) including instructions for performing, when executed by the processing system, one or more of the methods described herein. The software may reside entirely in the memory, or may also reside, completely or at least partially, within the RAM and/or within the processor during execution thereof by the computer system. Thus, the memory and the processor also constitute a system comprising machine-readable code.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A communication system comprising:
   a transmitter comprising:
      a covariance inducing module configured to accept blocks of transmission values and generate blocks of modulation values in dependence upon at least the blocks of transmission values, wherein the covariance inducing module is configured to transform the transmission values as a matrix multiplication by a matrix proportional to $H^{-1/2}$, where a covariance of noise introduced by the continuous channel into the demodulation values is proportional to H; and
      a modulation unit coupled to the covariance inducing module configured to accept the blocks of the modulation values and form a corresponding transmission signal for transmission over a continuous channel in dependence upon at least the blocks of modulation values and a signalling signal; and
   a receiver comprising:
      a demodulation unit configured to accept a received signal from the continuous channel, and generate blocks of demodulated values in dependence upon at least the received signal; and
      an covariance—intersymbol interference (ISI) reducing module configured to accept the blocks of demodulated values and form decoded values in dependence upon at least the blocks of demodulated values, each decoded value being an estimate of a transmission value;
   wherein the covariance inducing and covariance—ISI reducing modules are configured to apply to the transmission signal and remove from the received signal a predetermined intersymbol interference applied to a transmission established in dependence upon at least a multiplier factor K and a signal pulse characterized by at least a bandwidth B.

2. The system according to claim 1 wherein the modulation unit encodes the modulation values using a plurality of signal pulses spaced by T/K where T is the Nyquist rate associated with a signal of bandwidth B and K is greater than 1.

3. The system according to claim 1 wherein the multiplier factor K is selected according to characteristics of the continuous channel.

4. The system according to claim 1 wherein at least one of:
   the blocks of transmission values provided to the covariance inducing module have been pre-processed with at least one error correcting code of a plurality of error correcting codes; and
   the covariance—ISI reducing module performs iterative processing of at least one of soft and probability values to establish the estimate of a transmission value.

5. The system according to claim 1 wherein the modulation unit implements an encoding of the modulation values using a series of modulation pulses $s_0(t)$, $s_1(t)$, $s_{M-1}(t)$ at asynchronous time instances $0 \leq \tau_0 < , \ldots < \tau_{N-1}$ chosen so that the average rate of sending the modulation values exceeds the Nyquist rate.

6. A transmitter comprising:
   a covariance inducing module configured to accept blocks of transmission values and generate blocks of modulation values in dependence upon at least the blocks of transmission values, wherein the covariance inducing module is configured to transform the transmission values as a matrix multiplication by a matrix proportional to $H^{-1/2}$, where a covariance of noise introduced by the continuous channel into the demodulation values is proportional to H; and
   a modulation unit coupled to the covariance inducing module configured to accept the blocks of the modulation values and form a corresponding transmission signal for transmission over a continuous channel in dependence upon at least the blocks of modulation values and a signalling signal;
   wherein the covariance inducing module is configured to apply to the transmission signal a predetermined covariance established in dependence upon at least a multiplier factor K and a signal pulse characterized by at least a bandwidth B.

7. The transmitter according to claim 6 wherein the modulation unit encodes the modulation values using a plurality of signal pulses spaced by T/K where T is the Nyquist rate associated with a signal of bandwidth B and K is greater than 1.

8. The transmitter according to claim 6 wherein the multiplier factor K is selected according to characteristics of the continuous channel.

9. The transmitter according to claim 6 wherein at least one of:
   the blocks of transmission values provided to the covariance inducing module have been pre-processed with at least one error correcting code of a plurality of error correcting codes; and
   the modulation unit implements an encoding of the modulation values using a series of modulation pulses $s_0(t)$, $s_1(t)$, $\ldots$, $s_{M-1}(t)$ at asynchronous time instances $0 \leq \tau_0 < \ldots \tau_{N-1}$ chosen so that the average rate of sending the modulation values exceeds the Nyquist rate.

10. The transmitter according to claim 6 wherein either the modulation unit operates as a linear time-invariant (LTI) transmit filter or the covariance inducing unit and modulation unit are provided as a single stage linear time-varying transmit filter.

11. The transmitter according to claim 10 wherein the impulse response of the linear time-varying transmit filter is such that it introduces the desired covariance into the transmitted data and performs a linear time-invariant filtering.

12. The transmitter according to claim 6 wherein the covariance inducing unit and modulation unit comprise a signal generator generating a plurality of time offset pulses and a plurality of encoders for encoding an original uncorrelated data stream upon the plurality of time offset pulses, wherein when combined the encoded plurality of pulse streams have the desired covariance.

13. A receiver comprising:
   a network discovery module, the network discovery module establishing that the received signal comprises N messages broadcast to N users and that M other receivers have better noise than the receiver;

a demodulation unit configured to accept a received signal from the continuous channel, and generate blocks of demodulated values in dependence upon at least the received signal; and a covariance—ISI reducing module configured to accept the blocks of demodulated values and form decoded values in dependence upon at least the blocks of demodulated values, each decoded value being an estimate of a transmission value; wherein the covariance—ISI reducing module performs iterative processing to decode N–M messages in order to establish the message intended for that receiver and is configured to remove from the received signal a predetermined intersymbol interference applied to a transmission applied to a transmission channel coupled to the continuous channel, the predetermined intersymbol interference established in dependence upon at least a multiplier factor K and a signal pulse characterized by at least a bandwidth B.

14. The receiver according to claim 13 wherein the received signal comprises data encoded using a plurality of signal pulses spaced by T/K where T is the Nyquist rate associated with a signal of bandwidth B and K is greater than 1.

15. The receiver according to claim 13 wherein the multiplier factor K is selected according to characteristics of the continuous channel.

16. The receiver according to claim 13 wherein the covariance—ISI reducing module performs iterative processing of at least one of soft and probability values to establish the estimate of a transmission value.

17. The receiver according to claim 13 wherein the received signal comprises data generated by encoding of the modulation values using a series of modulation pulses $s_0(t)$, $s_1(t), \ldots, s_{M-1}(t)$ at asynchronous time instances $0 \leq \tau_0 < \tau_1 \ldots \tau_{N-1}$ chosen so that the average rate of sending the modulation values exceeds the Nyquist rate.

18. The receiver according to claim 13 further comprising an equalizer evaluating in an iteration of decoding at least one of soft outputs and reliability values of data and receiving likelihood ratios relating to values of the data in a preceding iteration.

19. The receiver according to claim 13 wherein the receiver comprises at least one of:

a matched filter and an intersymbol interference reducing module exploiting the covariance structure of the received signal;

a plurality of matched filters; and a plurality of time-varying correlators, each correlator followed by at least an integrator.

20. A transmitter comprising:

a covariance inducing module configured to accept blocks of transmission values and generate blocks of modulation values in dependence upon at least the blocks of transmission values, wherein the covariance inducing module is configured to transform the transmission values as a matrix multiplication by a matrix P, where P satisfies the equation $P \cdot P^\dagger = E_S \cdot H^{-1}/K$ where $P^\dagger$ is the Hermitian transpose of P, $E_S$ represents the average expected squared norm of the transmission signal over a predetermined time period, H is a matrix defined such that each matrix element $h_{ij}$ depends upon the degree of overlap between the modulation pulse for the $i^{th}$ modulation value in a block of modulation values to be transmitted and the $j^{th}$ modulation value in the block of modulation values to be transmitted, and K is a multiplier factor such that the covariance of noise introduced by the continuous channel into the demodulation values is proportional to H; and a modulation unit coupled to the covariance inducing module configured to accept the blocks of the modulation values and form a corresponding transmission signal for transmission over a continuous channel in dependence upon at least the blocks of modulation values and a signalling signal.

21. The transmitter according to claim 20, wherein the matrix P is found by applying a mathematical method selected from the group comprising Choleski decomposition, singular value decomposition, and eigenvalue decomposition.

22. The transmitter according to claim 20, wherein the transmitted data is converted to received data with a receiver comprising a covariance—intersymbol interference (ISI) reducing module configured to accept the blocks of demodulated values and form decoded values in dependence upon at least the blocks of demodulated values wherein each decoded value is an estimate of a transmission value and the covariance ISI reducing module in combination with the covariance inducing module of the transmitter act to nullify the effect of the matrix H.

* * * * *